US012723637B2

(12) United States Patent
Hirano et al.

(10) Patent No.: US 12,723,637 B2
(45) Date of Patent: Sep. 1, 2026

(54) FLUID-FILLED CYLINDRICAL VIBRATION DAMPING DEVICE

(71) Applicant: Sumitomo Riko Company Limited, Aichi (JP)

(72) Inventors: Masaaki Hirano, Aichi (JP); Takashi Kume, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 459 days.

(21) Appl. No.: 18/462,423

(22) Filed: Sep. 7, 2023

(65) Prior Publication Data

US 2023/0407940 A1 Dec. 21, 2023

Related U.S. Application Data

(63) Continuation of application No. PCT/JP2022/016195, filed on Mar. 30, 2022.

(30) Foreign Application Priority Data

Jul. 15, 2021 (JP) ................................ 2021-117390

(51) Int. Cl.
*F16F 9/53* (2006.01)
*F16F 9/00* (2006.01)
*F16F 9/34* (2006.01)

(52) U.S. Cl.
CPC .............. *F16F 9/535* (2013.01); *F16F 9/006* (2013.01); *F16F 9/3405* (2013.01); *F16F 2222/06* (2013.01); *F16F 2222/12* (2013.01)

(58) Field of Classification Search
CPC .......... F16F 9/006; F16F 9/535; F16F 9/3405; F16F 2222/06; F16F 2222/12

(Continued)

(56) References Cited

U.S. PATENT DOCUMENTS

2014/0217661 A1 8/2014 Schumann et al.
2020/0263751 A1 8/2020 Ito et al.

(Continued)

FOREIGN PATENT DOCUMENTS

CN 103797267 5/2014
DE 102011117749 5/2013

(Continued)

OTHER PUBLICATIONS

"International Search Report (Form PCT/ISA/210) of PCT/JP2022/016195", mailed on May 17, 2022, with English translation thereof, pp. 1-4.

(Continued)

*Primary Examiner* — Christopher P Schwartz
(74) *Attorney, Agent, or Firm* — JCIPRNET

(57) ABSTRACT

In a fluid-filled cylindrical vibration damping device, an inner shaft member and an outer shaft member are elastically linked by a main rubber elastic body, and fluid chambers in which a fluid is filled are provided to be in communication with each other through an orifice path. The fluid filled in the fluid chambers is a magnetic functional fluid. The fluid-filled cylindrical vibration damping device includes a magnetic unit generating a magnetic field through power conduction. Magnetic path formation members to which the magnetic field is applied by the magnetic unit are arranged on sidewall portions on two facing sides in the orifice path. A magnetic flux concentration part 46 is provided at at least one the magnetic path formation members. A dimension of the magnetic flux concentration part in a length direction of the orifice path is reduced toward an inward side in a facing direction.

14 Claims, 12 Drawing Sheets

(58) Field of Classification Search
USPC ......... 267/140.11–140.15, 140.2–140.5, 141, 267/1–141.7; 248/550, 566
See application file for complete search history.

(56) References Cited

U.S. PATENT DOCUMENTS

| | | | | |
|---|---|---|---|---|
| 2021/0381577 | A1* | 12/2021 | Ichikawa ................ | F16F 13/10 |
| 2023/0415559 | A1* | 12/2023 | Hirano ................. | B60K 5/1283 |

FOREIGN PATENT DOCUMENTS

| | | |
|---|---|---|
| JP | 2008151215 | 7/2008 |
| JP | 2011153691 | 8/2011 |
| JP | 2014525011 | 9/2014 |
| JP | 2020133700 | 8/2020 |
| WO | 2021240908 | 12/2021 |

OTHER PUBLICATIONS

"Written Opinion of the International Searching Authority (Form PCT/ISA/237) of PCT/JP2022/016195", mailed on May 17, 2022, with English translation thereof, pp. 1-10.

"The First Office Action of China Counterpart Application", issued on Mar. 30, 2026, with English translation thereof, p. 1-p. 13.

* cited by examiner

FLUID-FILLED CYLINDRICAL VIBRATION DAMPING DEVICE

CROSS-REFERENCE TO RELATED APPLICATION

This application is a continuation of PCT International Application No. PCT/JP2022/016195, filed on Mar. 30, 2022, which claims priority under 35 U.S.C § 119(a) to Japanese Patent Application No. 2021-117390, filed on Jul. 15, 2021. Each of the above application(s) is hereby expressly incorporated by reference, in its entirety, into the present application.

BACKGROUND

Technical Field

The disclosure relates to a fluid-filled cylindrical vibration damping device which exerts a vibration damping effect based on a flowing behavior of a fluid filled inside.

Description of Related Art

Conventionally, as a type of vibration damping device used in an engine mount for an automobile, etc., a cylindrical vibration damping having a configuration in which an inner shaft member and an outer cylindrical member are elastically linked by a main rubber elastic body is known. A fluid-filled cylindrical vibration damping device making use a vibration damping effect based on a flowing behavior of a fluid filled inside to facilitate the vibration damping performance, etc., is also conventionally known. For example, Japanese Laid-open No. 2008-151215 (Patent Document 1) and German Patent Publication No. 102011117749 (Patent Document 2) disclose that excellent vibration damping performance is exhibited by a fluid flowing through an orifice path.

PRIOR ART DOCUMENTS

Patent Documents

[Patent Document 1] Japanese Laid-open No. 2008-151215

[Patent Document 2] German Patent Publication No. 102011117749

The vibration damping effect of the orifice path is effectively exerted against the vibration of a specific frequency to which the orifice path is tuned in advance, whereas it is difficult to exert the vibration damping effect against the vibration of a frequency range deviating from the tuning frequency. Therefore, in order to attain an effective vibration damping effect against the vibration of a wider frequency range, for example, Patent Document 2 considers to arrange the fluid filled inside as a magneto-rheological fluid and switch vibration damping properties by controlling the magnitude of the magnetic field applied to the magneto-rheological fluid. Specifically, by increasing the magnitude of the magnetic field applied to the magneto-rheological fluid, the rheological degree of the magneto-rheological fluid increases to increase the flowing resistance in the orifice path, and the tuning frequency of the orifice path becomes a lower frequency. Therefore, by controlling the magnitude of the magnetic field applied to the magneto-rheological fluid in accordance to the frequency of the input vibration, it is possible to effectively attain a vibration damping effect by using the orifice path against the vibration input of a wider frequency range.

In Patent Document 2, when vibration damping performance across a wider frequency range is to be attained, in order to control the rheological degree of the magneto-rheological fluid in a wider range, it is necessary to generate a stronger magnetic field. However, the consumed power increases in order to generate a strong magnetic field. However, for example, in recent automobiles, the consumed power has increased significantly due to the dramatic increase in the number and sophistication of electrical components, and there is a demand to prevent the consumed power from further increasing. Therefore, the power consumption allowed for the vibration damping device is limited.

SUMMARY

According to an aspect of the disclosure, a fluid-filled cylindrical vibration damping device is provided. In the fluid-filled cylindrical vibration damping device, an inner shaft member and an outer shaft member are elastically linked by a main rubber elastic body, and a plurality of fluid chambers in which a fluid is filled are provided to be in communication with each other through an orifice path. The fluid filled in the fluid chambers is a magnetic functional fluid. The fluid-filled cylindrical vibration damping device comprises a magnetic unit generating a magnetic field through power conduction. Magnetic path formation members to which the magnetic field is applied by the magnetic unit are arranged on sidewall portions on both sides facing each other in the orifice path. A magnetic flux concentration part is provided at at least one the magnetic path formation members arranged on the sidewall portions of the both sides, and a dimension of the magnetic flux concentration part in a length direction of the orifice path is reduced toward an inward side in a facing direction.

DESCRIPTION OF THE EMBODIMENTS

Figure 1:
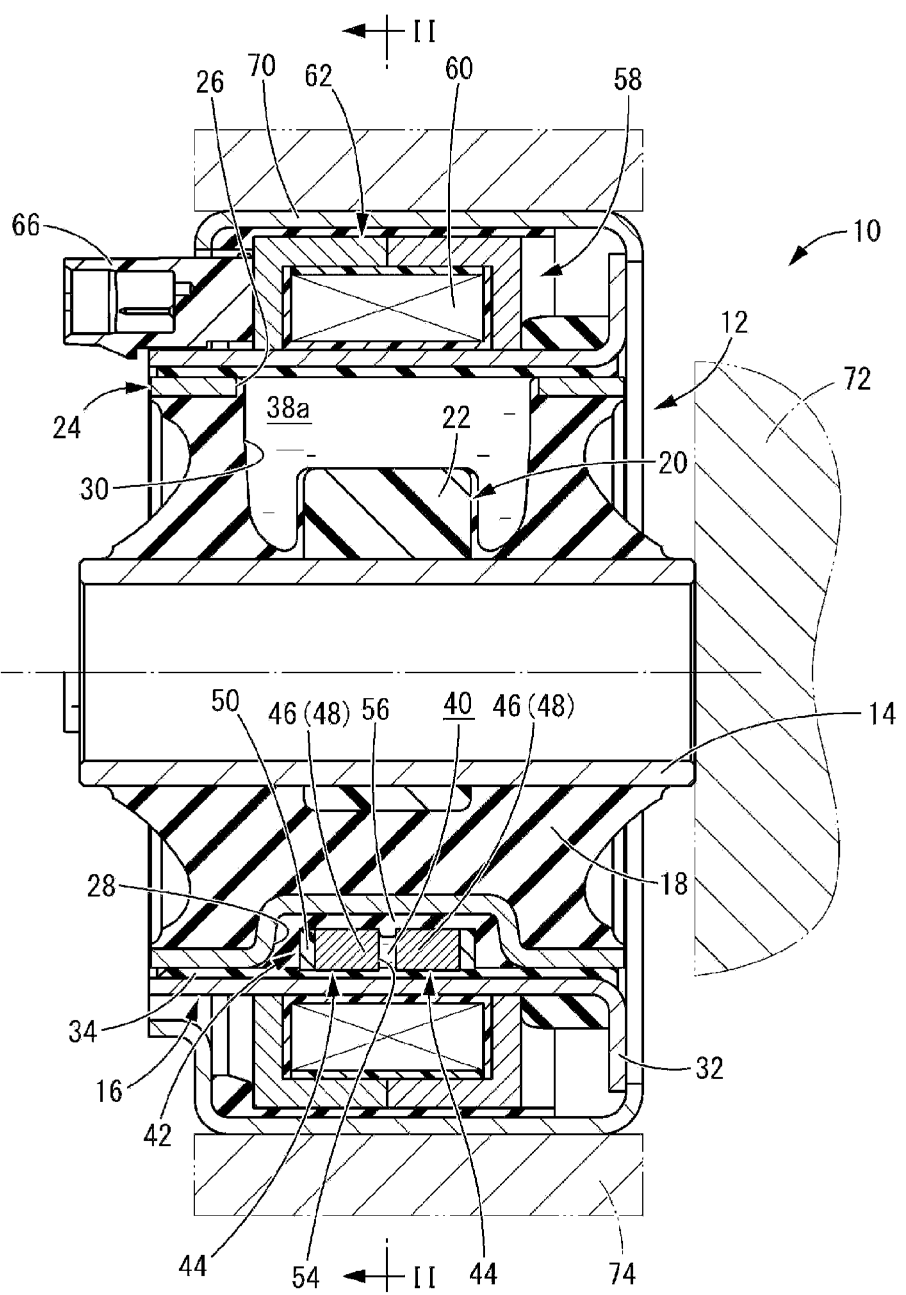
FIG. 1 is a cross-sectional view illustrating an engine mount as a first embodiment of the disclosure, and is equivalent to a cross-section I-I of FIG. 2.

The disclosure provides a fluid-filled cylindrical vibration damping device with a novel configuration able to efficiently control the flowing behavior of the orifice path and easily able to efficiently regulate or switch the vibration damping properties while suppressing the consumed power.

Hereinafter, exemplary embodiments for understanding the disclosure will be described, but each embodiment described below is described as an exemplary example, and may be used in combination with each other as appropriate. Multiple components described in each aspect can also be recognized and adopted independently as much as possible, and can also be adopted in combination with any component described in another aspect as appropriate. Accordingly, the disclosure can be implemented in various alternatives without being limited to the embodiments described below.

According to a first aspect, in a fluid-filled cylindrical vibration damping device, an inner shaft member and an outer shaft member are elastically linked by a main rubber elastic body, and a plurality of fluid chambers in which a fluid is filled are provided to be in communication with each other through an orifice path. The fluid filled in the fluid chambers is a magnetic functional fluid. The fluid-filled cylindrical vibration damping device includes a magnetic unit generating a magnetic field through power conduction. Magnetic path formation members to which the magnetic field is applied by the magnetic unit are arranged on sidewall portions on both sides facing each other in the orifice path. A magnetic flux concentration part is provided at at least one the magnetic path formation members arranged on the sidewall portions of the both sides, and a dimension of the magnetic flux concentration part in a length direction of the orifice path is reduced toward an inward side in a facing direction.

According to the fluid-filled cylindrical vibration damping device of the aspect, through the magnetic flux concentration effect by using the magnetic flux concentration part, the magnetic force generated by the magnetic unit can be intensively applied to the magnetic functional fluid in the orifice path at a high density. Therefore, it is possible to control the flowing behavior of the orifice path by using less consumed power, and, for example, the required vibration damping performance is obtained easily while suppressing the consumed power.

According to a second aspect, in the fluid-filled cylindrical vibration damping device of the first aspect, the magnetic path formation members arranged on the sidewall portions of the both sides of the orifice path are components independent from each other, and are linked to each other by a linking part.

According to the fluid-filled cylindrical vibration damping device of the aspect, it is possible to integrally handle the pair of magnetic path formation members, and the manufacture of the vibration damping device is simplified.

According to a third aspect, in the fluid-filled cylindrical vibration damping device of the second aspect, the magnetic path formation members arranged on the sidewall portions of the both sides of the orifice path are formed by a ferromagnetic material, and the linking part is formed by a non-magnetic material.

According to the fluid-filled cylindrical vibration damping device of the aspect, by arranging the linking part linking the pair of magnetic path formation members to each other as a non-magnetic material, the magnetic flux can be suppressed from being guided to the linking part between the pair of magnetic path formation members, and the magnetic force can be efficiently applied to the orifice path between the pair of magnetic path formation members.

According to a fourth aspect, in the fluid-filled cylindrical vibration damping device of the second or third aspect, the magnetic path formation members arranged on the sidewall portions of the both sides of the orifice path are integrally formed with the linking part.

According to the fluid-filled cylindrical vibration damping device of the aspect, for example, by integrally forming the linking part with respect to the pair of magnetic path formation members, the pair of magnetic path formation members can be easily linked by the linking part. It is noted that, for example, by integrally forming the pair of magnetic path formation members with respect to the linking part, the pair of magnetic path formation members can also be easily linked by the linking part.

According to a fifth aspect, in the fluid-filled cylindrical vibration damping device of the second or third aspect, the magnetic path formation members arranged on the sidewall portions of the both sides of the orifice path are linked by post-fixing the linking part formed by a separate component to the magnetic path formation members arranged on the sidewall portions of the both sides of the orifice path.

According to the fluid-filled cylindrical vibration damping device of the aspect, by arranging the pair of magnetic path formation members and the linking part as separate components, the pair of magnetic path formation members and the linking part can respectively be manufactured easily.

According to a sixth aspect, in the fluid-filled cylindrical vibration damping device of any one of the first to fifth aspects, the sidewall portions of the both sides of the orifice path are formed by combining the magnetic path formation members and a sidewall member formed by a non-magnetic material, and the magnetic path formation members partially form the sidewall portions of the orifice path in the length direction.

According to the fluid-filled cylindrical vibration damping device of the aspect, the dimension of the magnetic flux concentration part in the length direction of the orifice path can be reduced, the magnetic flux can be concentrated, and the path length of the orifice path required for vibration damping properties can be secured by the sidewall member formed by a non-magnetic material.

According to a seventh aspect, in the fluid-filled cylindrical vibration damping device of any one of the first to sixth aspects, the magnetic path formation members arranged on the sidewall portions of the both sides of the orifice path are arranged in shapes symmetric to each other.

According to the fluid-filled cylindrical vibration damping device of the aspect, the magnetic flux concentration parts are respectively provided on the magnetic path formation members on the both sides, and the magnetic flux concentration parts are disposed to face each other. Therefore, the magnetic force in the portions where the magnetic flux concentration parts of the both sides are disposed to face each other is efficiently applied to the magnetic functional fluid in the orifice path.

According to an eighth aspect, in the fluid-filled cylindrical vibration damping device of any one of the first to seventh aspects, the magnetic flux concentration part in the magnetic path formation member has a tapered portion whose dimension in the length direction of the orifice path is gradually reduced toward the inward side in the facing direction.

According to the fluid-filled cylindrical vibration damping device of the aspect, the volume of the magnetic path formation member can be easily secured while reducing the dimension of the magnetic flux concentration member in the length direction of the orifice path at the end part of the sidewall part of the orifice path on the inward side of the facing direction.

According to a ninth aspect, in the fluid-filled cylindrical vibration damping device of any one of the first to eighth aspects, the magnetic path formation member extends outward of the orifice path on at least one side in the length direction of the orifice path.

According to the fluid-filled cylindrical vibration damping device of the aspect, by making the magnetic path formation member longer in the length direction of the orifice path, the magnetic flux of a wider range is guided to the magnetic flux concentration part, and the magnetic force can be intensively and efficiently applied to the magnetic functional fluid in the orifice path.

According to a tenth aspect, in the fluid-filled cylindrical vibration damping device of the ninth aspect, the magnetic path formation member extends outward in a circumferential direction from two end parts in the circumferential direction of the orifice path, respectively, and is arranged, as a whole, in an annular shape extending in a circumferential direction of the outer cylindrical member.

According to the fluid-filled cylindrical vibration damping device of the aspect, the magnetic path formation member extending outward with respect to the orifice path in the length direction of the orifice path is arranged in an annular shape extending in the circumferential direction of the outer cylindrical member as a whole. Accordingly, it is easy to secure a space for accommodating the long magnetic path formation member in the cylindrical vibration damping device.

According to an eleventh aspect, in the fluid-filled cylindrical vibration damping device of the tenth aspect, an intermediate sleeve is fixed to an outer circumferential portion of the main rubber elastic body, and the magnetic path formation member arranged, as a whole, in the annular shape is installed to the intermediate sleeve in an externally inserted state, and the outer cylindrical member is installed to the magnetic path formation member in an externally inserted state.

According to the fluid-filled cylindrical vibration damping device of the aspect, the magnetic path formation member is held between the intermediate sleeve and the outer cylindrical member. Therefore, the magnetic path formation member can be easily installed, and the magnetic path formation member can be arranged in a stable support manner.

According to a twelfth aspect, in the fluid-filled cylindrical vibration damping device of any one of the first to eleventh aspects, in a tip end surface in the magnetic flux concentration part of the magnetic path formation member on the inward side in the facing direction, a dimension in the length direction of the orifice path is 60% or less with respect to a total length of the orifice path.

According to the fluid-filled cylindrical vibration damping device of the aspect, in the length direction of the orifice path, the dimension of the tip end surface in the magnetic flux concentration part on the inward side in the facing direction is sufficiently reduced, and the magnetic force can be intensively applied to the magnetic functional fluid in the orifice path.

According to the disclosure, in the fluid-filled cylindrical vibration damping device, the control on the flowing behavior of the orifice path can be exerted efficiently, and the demand to efficiently regulate or switch the vibration damping properties while suppressing the consumed power, for example, is easily coped with.

In the following, the embodiments of the disclosure are described with reference to the drawings.

Figure 2:
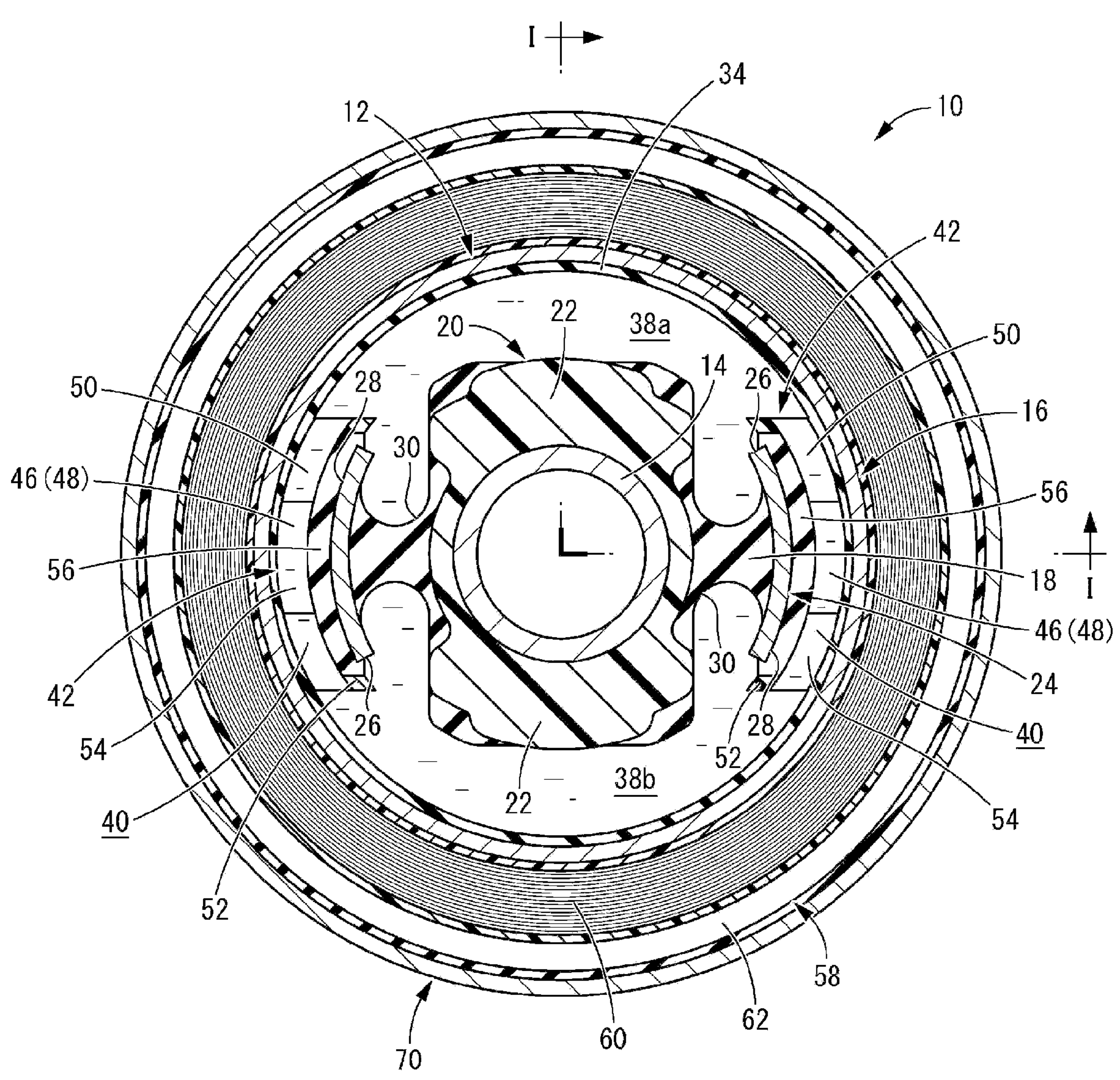
FIG. 2 is a cross-sectional view of II-II of FIG. 1.
Figure 3:
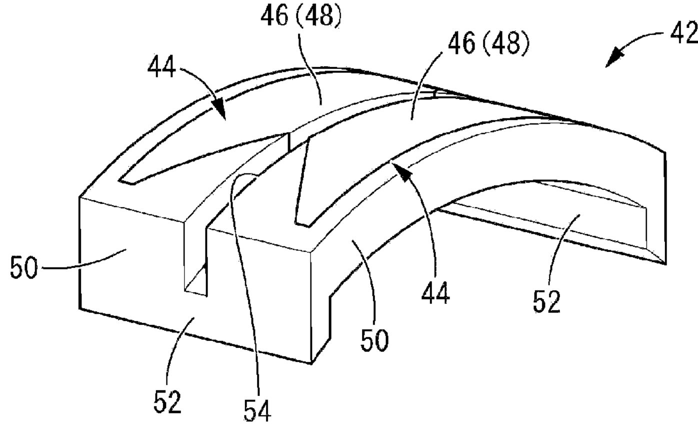
FIG. 3 is a perspective view of an orifice member forming the engine mount shown in FIG. 1.
Figure 4:
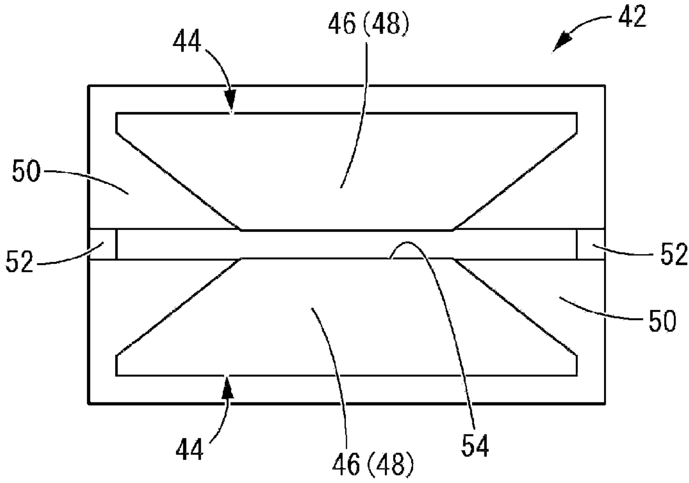
FIG. 4 is a front view of the orifice member shown in FIG. 3.
Figure 5:
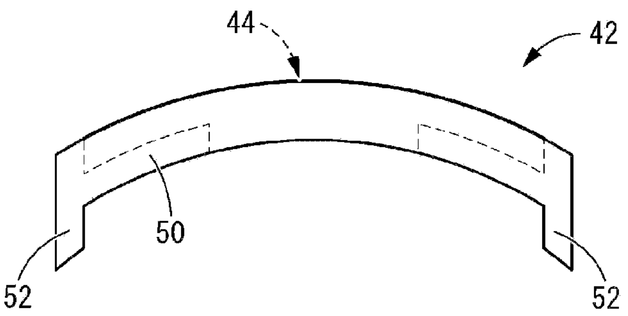
FIG. 5 is a bottom view of the orifice member shown in FIG. 4.
Figure 6:
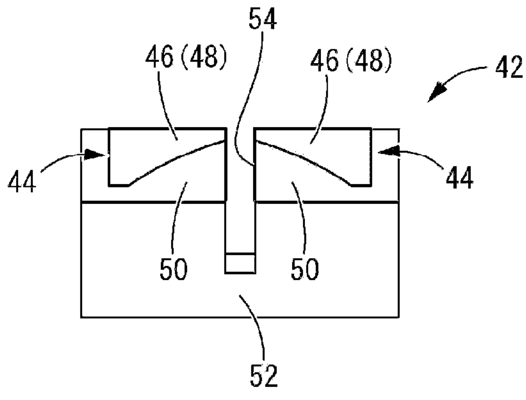
FIG. 6 is a side view of the orifice member shown in FIG. 4.

In FIGS. 1 to 2, as a first embodiment of a vibration damping device configured according to the disclosure, an engine mount 10 of an automotive is shown. The engine mount is a fluid-filled vibration damping device, and includes a vibration damping device body 12. The vibration damping device body 12 has a configuration in which an inner shaft member 14 and an outer cylindrical member 16 are linked by a main rubber elastic body 18. In the following descriptions, in principle, the axial direction refers to the left-right direction of FIG. 1, which is a mount central axis direction, and the upper-lower direction refers to the upper-lower direction of FIG. 2, which is a main vibration input direction.

The inner shaft member 14 is formed in a substantially cylindrical shape with a small diameter, and extends linearly in the axial direction. The inner shaft member 14 may be formed by a non-magnetic material, such as being formed by stainless steel or aluminum alloy. A stopper member 20 is fixed to the central portion of the inner shaft member 14 in the axial direction. The stopper member 20 is arranged in an annular shape as a whole and, as shown in FIG. 2, includes two protrusion parts 22, 22 protruding toward both sides in the upper-lower direction in which two fluid chambers 38, 38 to be described afterwards are arranged.

As shown in FIGS. 1 and 2, an intermediate sleeve 24 is provided on the periphery of the inner shaft member 14. The intermediate sleeve 24 is formed in a substantially cylindrical shape with a diameter greater than the inner shaft member 14, and is disposed in an externally inserted state separated toward the outer circumferential side throughout the entire circumference with respect to the inner shaft member 14. The intermediate sleeve 24 includes a window part 26 at each of two places in the circumferential direction. The window part 26 penetrates through the intermediate sleeve 24 in the radial direction in the central portion of the intermediate sleeve 24 in the axial direction. Between the two window parts 26, 26 in the intermediate sleeve 24 in the circumferential direction, groove-like parts 28 are respectively provided. The groove-like part 28 is a portion of the intermediate sleeve 24 with a partially reduced diameter and formed in a concave groove shape open to the outer peripheral surface. The groove-like part 28 extends through the axial central portion of the intermediate sleeve 24 in the circumferential direction. The two ends of the groove-like part 28 in the circumferential direction respectively reach the two window parts 26, 26. The intermediate sleeve 24, like the inner shaft member 14, may be formed by a non-magnetic material, such as being formed by stainless steel or aluminum alloy.

The inner shaft member 14 and the intermediate sleeve 24 are linked by the main rubber elastic body 18. The main rubber elastic body 18 is in a substantially cylindrical shape, the inner circumferential portion is fixed to the inner shaft member 14, and the outer circumferential portion is fixed to the intermediate sleeve 24. In addition, the main rubber elastic body 18 covers the groove inner surface of the groove-like part 28 in the intermediate sleeve 24, and is also fixed to the outer circumferential surface of the intermediate sleeve 24 in the groove-like part 28. The main rubber elastic body 18 is formed as an integrally vulcanized molded article including the inner shaft member 14 and the intermediate sleeve 24.

As shown in FIG. 2, the main rubber elastic body 18 includes two pocket-like parts 30, The pocket-like parts 30 are configured like recesses open to the outer circumferential surface of the main rubber elastic body 18, and are open toward the both sides in the upper-lower direction in the embodiment. The pocket-like parts 30 are provided at positions corresponding to the window parts 26 of the intermediate sleeve 24, opening perimeter parts of the pocket-like parts 30 are fixed to the window parts 26, and the pocket-like parts 30 are open toward the outer circumferential side through the window parts 26. The protrusion part 22 of the stopper member 20 is protrusive at the inner circumferential bottom part of the pocket-like part 30.

The outer cylindrical member 16 is externally inserted and fixed to the intermediate sleeve 24 fixed to the main rubber elastic body 18. The outer cylindrical member 16 is configured in a substantially cylindrical shape with a diameter greater than the inner shaft member 14. An end part of the outer cylindrical member 16 in the axial direction includes a flange-like part 32 protruding toward the outer circumferential side. The outer cylindrical member 16 is formed by a non-magnetic material, such as being formed by stainless steel or aluminum alloy. The inner circumferential surface of the outer cylindrical member 16 is covered by a seal rubber layer 34.

The outer cylindrical member 16 is mounted to the intermediate sleeve 24 in an externally inserted state. For example, the outer cylindrical member 16 is fit to the outer circumferential surface of the intermediate sleeve 24 by performing a diameter reduction process such as eight-way squeezing, etc. In addition, with the seal rubber layer 34 being sandwiched therebetween, the outer cylindrical member 16 and the intermediate sleeve 24 are sealed in a fluid-tight manner.

The window part 26 of the intermediate sleeve 24 is covered by the outer cylindrical member 16 in a fluid-tight manner. Accordingly, between the inner shaft member 14 and the outer cylindrical member 16, a first fluid chamber 38*a* and a second fluid chamber 38*b* are formed as two fluid chambers 38, 38. In each of the fluid chambers 38*a*, 38*b*, the wall parts on the both sides in the axial direction are formed by the main rubber elastic body 18. In addition, in each of the fluid chambers 38*a*, 38*b*, the protrusion part 22 of the stopper member 20 protrudes from the inner side toward the outer side in the radial direction. The first and second fluid chambers 38*a*, 38*b* are provided to be separated from each other in the circumferential direction. In the embodiment, the first and second fluid chambers 38*a*, 38*b* are arranged on both sides in the upper-lower direction with respect to the inner shaft member 14, that is, both sides in the axis right angle direction with respect to the mount central axis.

A magnetic functional fluid is filled into each of the fluid chambers 38*a*, 38*b*. The magnetic functional fluid is a fluid whose rheological degree is increased through acting of a magnetic field. The magnetic functional fluid may be any of a magneto-rheological fluid (MRF), a magnetic fluid (MF), a magnetic composite fluid (MCF) mixing MRF and MF. As the magnetic functional fluid, an MRF whose rheological degree changes significantly with respect to the acting of a magnetic field may be adopted, and an MCF whose magnitude of increase in the rheological degree can be easily regulated according to the mixing ratio between MRF and MF may also be adopted as appropriate.

The magnetic functional fluid, for example, is a suspension or a colloidal solution in which ferromagnetic fine particles are dispersed in a base liquid such as water, oil, etc. The surfaces of the ferromagnetic fine particles are coated with a surfactant, or the ferromagnetic fine particles are dispersed in a base liquid with addition of a surfactant, so that it is difficult for the ferromagnetic fine particles to aggregate or to deposit in the base liquid.

The ferromagnetic fine particles are, for example, metal particles of iron, ferrite, magnetite, etc., and the particle diameter may range, for example, between about 8 nm and about 10 μm. The base liquid is not particularly limited, as long as the ferromagnetic fine particles can be dispersed. For example, water, isoparaffin, alkylnaphthalene, perfluoropolyether, polyolefin, silicone oil, etc., may be adopted. In addition, the base liquid may be a non-compressible fluid. The surfactant may be selected as appropriate in accordance with the base liquid, for example, oleic acid, etc., may be adopted as appropriate. MRF and MF mainly differ in the particle diameter of the ferromagnetic fine particles. The particle diameter of the ferromagnetic fine particles in MRF is greater than that of MF.

The first and second fluid chambers 38*a*, 38*b* are in communication with each other by an orifice path 40. The orifice path 40 extends in the circumferential direction between the outer cylindrical member 16 and the intermediate sleeve 24, and the two end parts thereof in the circumferential direction are respectively in communication with the first and second fluid chambers 38*a*, 38*b*. In the forming region of the orifice path 40, the outer circumferential opening of the groove-like part 28 provided in the intermediate sleeve 24 is formed by being sealed by the outer cylindrical member 16 in a fluid-tight manner. In the embodiment, the pair of orifice paths 40, 40 are provided on both sides of the first fluid chamber 38*a* in the circumferential direction, and respectively allow communication between the first fluid chamber 38*a* and the second fluid chamber 38*b* in the circumferential direction. In the axis right angle direction of the mount central axis, the pair of orifice paths 40, 40 are provided on both sides in a direction (left-right direction in FIG. 2) orthogonal to the facing direction between the first fluid chamber 38*a* and the second fluid chamber 38*b*, and allow communication between the first fluid chamber 38*a* and the second fluid chamber 38*b* in parallel on both sides in the radial direction. The first and second fluid chambers 38*a*, 38*b* and the orifice paths 40, 40 are arranged in the circumferential direction in a space-efficient manner, and the size of the engine mount 10 is prevented from increasing. In addition, in the embodiment, although the pair of orifice paths 40, 40 are formed with path cross-sectional areas and path lengths equal to each other, the path cross-sectional areas and/or the path lengths of the two orifice paths may also be different from each other.

Figure 7:
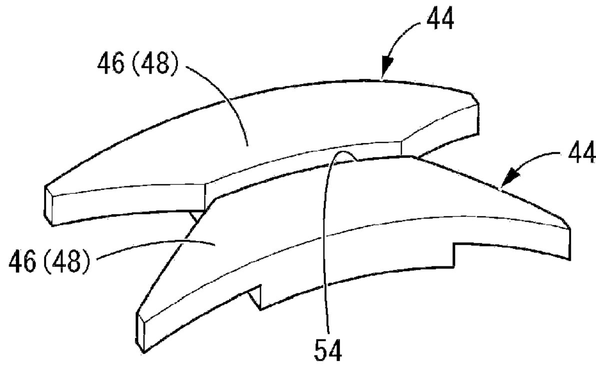
FIG. 7 is a perspective view of a magnetic path formation member forming the orifice member shown in FIG. 1.

In addition, the sidewall portion of the orifice path 40 is formed by an orifice member 42. As shown in FIGS. 3 to 6, the orifice member 42 is arranged in a curved plate shape as a whole. The orifice member 42 includes a pair of magnetic path formation members 44, 44 as shown in FIG. 7.

The magnetic path formation member 44 is formed by a ferromagnetic material such as iron, nickel, chromium, soft ferrite, etc. The orifice member 42 includes the pair of magnetic path formation members 44, 44 independent from each other and separated from each other at a predetermined distance in the axial direction (upper-lower direction in FIG. 4) to face each other. The pair of magnetic path forming members 44, 44 of the embodiment are arranged in a shape with a 180-degree rotational symmetry and are made common. In the pair of magnetic path formation members 44, 44, the length dimension in the circumferential direction is reduced at the inner end with respect to the outer end in the facing direction of the pair of magnetic path formation members 44, 44. In addition, the pair of magnetic path formation members 44, 44 each includes a magnetic flux concentration part 46 whose length dimension in the circumferential direction is reduced toward the inward side in the facing direction. The entirety of the magnetic flux concentration part 46 is formed by a tapered portion whose length dimension in the circumferential direction is gradually reduced toward the inward side in the facing direction. In the embodiment, the two ends of the tapered portion 48 in the circumferential direction are respectively inclined, at inclination angles of substantially the same magnitude toward the inner side in the circumferential direction, toward the inward side in the facing direction of the pair of magnetic path formation members 44, 44. In the magnetic path formation member 44, the central portion of the circumferential direction whose length in the circumferential direction is set to be the same as the inner end of the magnetic flux concentration part 46 in the facing direction is arranged to be thicker than outer portions in the circumferential direction located on the outer sides in the circumferential direction with respect to the inner end of the magnetic flux concentration part 46 in the facing direction. In the magnetic path formation member 44, the entire outer circumferential surface is a smooth curved surface located on a substantially single cylindrical surface. In addition, the central portion in the circumferential direction is arranged to be thick by protruding toward the inner circumference with respect to the portions in the circumferential direction. The magnetic path forming member 44 may be formed by a soft magnetic material with small residual magnetization.

Respective sidewall members 50 are fixed to the pair of magnetic path formation members 44, 44, and the sidewall members 50 are linked with each other by linking parts 52, 52 integrally formed at two end parts in the circumferential direction. Accordingly, the magnetic path formation members 44, 44 that are components independent from each other are linked by the linking parts 52, 52 via the sidewall members 50, 50, thereby forming the orifice member 42.

The sidewall member 50 is formed by a non-magnetic material, such as being formed by a synthetic resin, rubber, or a non-magnetic metal such as aluminum alloy or stainless steel. The sidewall member 50 is fixed to the outer surface in the axial direction and the two end surfaces in the circumferential direction of the magnetic path formation member 44. The two end surfaces of the sidewall member 50 in the circumferential direction are arranged as planar surfaces extending substantially parallel to a plane orthogonal to the circumferential direction at the center of the magnetic path formation member 44 in the circumferential direction. The side wall member 50 is also located on the two outer sides in the circumferential direction with respect to the magnetic flux concentration part 46 (tapered portion 48). The sidewall members 50 fixed to the pair of magnetic path formation members 44, 44 are separated by a predetermined distance in the axial direction to face each other on two outer sides in the circumferential direction with respect to the magnetic flux concentration parts 46. The facing distance between the pair of magnetic flux concentration parts 46, 46 and the facing distance between the pair of sidewall members 50, 50 are set to be substantially the same.

The linking parts 52 protrude toward the inner circumference at the end parts of the sidewall members 50, 50 in the circumferential direction, and integrally link the pair of sidewall members 50, 50 by continuing in the axial direction across the pair of sidewall members 50, 50. In addition, with the pair of magnetic path formation members 44, 44 being linked to each other by the linking parts 52 via the pair of sidewall members 50, 50, the orifice member 42 including the pair of magnetic path formation members 44, 44 and the pair of sidewall members 50, 50 is formed. The linking parts 52 of the embodiment are integrally formed with the sidewall members 50, 50. The linking part 52 is formed by a non-magnetic material, such as being formed by a synthetic resin, rubber, or a non-magnetic metal such as aluminum alloy or stainless steel. The linking parts 52 are respectively provided at the two end parts of the sidewall members 50, 50 in the circumferential direction. With the sidewall members 50, 50 being linked at the two end parts in the circumferential direction, the shape stability of the orifice member 42 is facilitated. The linking parts 52 are located on the outer side in the circumferential direction with respect to the magnetic path formation member 44.

The pair of magnetic path formation members 44, 44 and the pair of sidewall members 50, 50 are integrally linked by the linking parts 52, 52 to be positioned with respect to each other. Accordingly, at the facing interval in the axial direction between the pair of magnetic path formation members 44, 44 and the pair of sidewall members 50, 50 in the orifice member 42, a slit-like part 54 extending in the circumferential direction is formed. The slit-like part 54 penetrates through the radial direction, which is the thickness direction of the orifice member 42, and is open to the outer circumferential surface and the inner circumferential direction of the orifice member 42, respectively. A sidewall portion of the slit-like part 54 is formed by combining the magnetic path formation member 44 formed by a ferromagnetic material and the sidewall member 50 formed by a non-magnetic material. More specifically, in the sidewall portion of the slit-like part 54, the central portion in the circumferential direction is formed by the magnetic path formation member 44, and two end parts in the circumferential direction are formed by the sidewall member 50.

In the orifice member 42 with such configuration, the magnetic path formation members 44, 44 are integrally formed by the sidewall members 50, 50 and the linking parts 52. That is, in the orifice member 42 of the embodiment, the magnetic path formation members 44, 44 are integrally molded with the sidewall members 50, 50 and the linking parts 52 by insert molding the magnetic path formation members 44 with respect to the sidewall members 50, 50 and the linking parts 52.

As shown in FIGS. 1 and 2, the orifice member 42 is inserted into the groove-like part 28 to be installed to the intermediate sleeve 24. That is, the orifice member 42 is positioned in the radial direction by being overlapped with the outer circumferential surface of the intermediate sleeve 24, and is positioned in the circumferential direction with respect to the intermediate sleeve 24 by overlapping the linking parts 52, 52 protruding toward the inner circumference with the two end surfaces of the bottom wall part of the groove-like part 28 in the circumferential direction. In addition, by mounting the outer cylindrical member 16 to the intermediate sleeve 24 in an externally inserted state, the outer circumferential surface of the orifice member 42 is overlapped with the inner circumferential surface of the outer cylindrical member 16 via the seal rubber layer 34, and the orifice member 42 is disposed between the intermediate sleeve 24 and the outer cylindrical member 16.

By overlapping the inner circumferential surface of the orifice member 42 with the bottom wall part of the groove-like part 28 of the intermediate sleeve 24, the inner circumferential opening of the slit-like part 54 of the orifice member 42 is covered by the intermediate sleeve 24. With the inner surface of the groove-like part 28 covered by a rubber layer 56, the orifice member 42 is pressed against the bottom wall part of the groove like part 28 via the rubber layer 56, and the inner circumferential opening of the slit-like part 54 is blocked in a liquid-tight manner.

In addition, by overlapping the outer circumferential surface of the orifice member 42 with the inner circumferential surface of the outer cylindrical member 16 via the seal rubber layer 34, the outer circumferential opening of the slit-like part 54 of the orifice member 42 is blocked in a liquid-tight manner.

Accordingly, a tunnel-like flow path extending in the circumferential direction and formed by using the slit-like part 54 is formed between the intermediate sleeve 24 and the outer cylindrical member 16. In addition, the two end parts of the tunnel-like flow path in the circumferential direction are respectively in communication with the first and second fluid chambers 38*a*, 38*b*. Accordingly, the orifice path 40 allowing mutual communication of the first and second fluid chambers 38*a*, 38*b* is formed. The orifice path 40 extends in the circumferential direction of the outer cylindrical member 16, and the length direction of the orifice path 40 is set as the circumferential direction of the outer cylindrical member 16. In the embodiment, the orifice members 42 are respectively installed to the pair of groove-like parts 28, 28 on both sides of the intermediate sleeve 24 in the radial direction, and the orifice paths 40 are respectively formed in the orifice members 42. The pair of orifice paths 40, 40 may be fine-tuned to a frequency the same as each other, and may also be fine-tuned to frequencies different from each other. In brief, it is not required that the pair of orifice paths 40, 40 have mutually the same size, such as path cross-sectional area or path length, or have mutually the same path shape.

In the orifice path 40, the sidewall portions on the both sides in the axial direction are formed by the sidewall portions of the slit-like part 54 in the orifice member 42. Accordingly, in the sidewall portion of the orifice path 40, the central portion in the path length direction of the orifice path 40 is partially formed by the magnetic flux concentration part 46 of the magnetic path formation member 44, and the both sides in the path length direction with respect to the magnetic path formation member 44 are formed by the sidewall member 50. The sidewall portion of the orifice path 40 is formed by combining the magnetic path formation member 44 formed by a ferromagnetic material and the sidewall member 50 formed by a non-magnetic material. Even if the length dimension of the magnetic flux concentration part 46 in the path length direction is reduced at the inner end in the axial direction, with the sidewall member 50 being arranged on the both sides in the path length direction with respect to the magnetic flux concentration part 46, the path length of the orifice path 40 can be set with a higher degree of freedom.

In the tip end surface of the magnetic flux concentration part 46 on the inward side in the axial direction, which forms the sidewall inner surface of the orifice path 40, the dimension thereof in the path length direction of the orifice path may be 60% or less with respect to the total length of the orifice path 40 (the path length dimension of the entire orifice path 40). More specifically, in the path length direction of the orifice path 40, the dimension of the tip end surface of the magnetic flux concentration part 46 is set to be 40% or less of the total length of the orifice path 40. Although the tip end surface of the magnetic flux concentration part 46 on the inward side in the axial direction may be arranged in a pointed shape with a dimension in the path length direction of the orifice path 40 as substantially zero, such tip end surface may be extended to a certain extent in the path length direction, such as being set to 10% or more with respect to the total length of the orifice path 40.

A magnetic unit 58 is installed to the outer cylindrical member 16. The magnetic unit 58 as a whole is configured in a substantially ring shape, and has a configuration in which a yoke member 62 is installed to the periphery of a coil 60. In addition, by conducting power to the coil 60, the magnetic unit 58 generates a magnetic field.

The coil 60 as a whole is arranged in a cylindrical shape or a ring shape, and is formed by winding an electric wire formed by a conductive material. The coil 60 is formed by being wound on a bobbin formed by a synthetic resin. The coil 60 may be formed by a material with excellent electrical conductivity, such as being formed by copper, aluminum alloy. The coil 60 is conductive to a terminal of a connector 66, and is electrically connected to an external electric control device not shown herein via the connector 66.

The yoke member 62 is formed by a ferromagnetic material, such as iron. The yoke member 62 has a substantially U-shaped cross-section open toward the inner circumference, and is arranged to cover two end surfaces of the coil 58 in the axial direction and the outer peripheral surface of the coil 60. Accordingly, when a current in the circumferential direction flows with respect to the coil 60, the magnetic flux of the coil 60 is guided to the yoke member 62 as a ferromagnetic material, that is, a magnetic path is formed by the yoke member 62, and the magnetic flux leakage to the outer side in the axial direction and to the outer circumference is reduced. The yoke member 62 of the embodiment is arranged in a split configuration so as to be mounted to the coil 60.

As shown in FIGS. 1 and 2, the magnetic unit 58 is disposed to be inserted externally with respect to the outer cylindrical member 16, and the magnetic unit 58 is installed to the outer circumferential side of the outer cylindrical member 16 in the state in which the inner circumferential surface is overlapped with the outer circumferential surface of the outer cylindrical member 16. A cylindrical cover member 70 is arranged on the outer circumference of the magnetic unit 58, and the magnetic unit 58 is arranged between the outer cylindrical member 16 and the cylindrical cover member 70.

The cylindrical cover member 70 is formed in a substantially cylindrical shape as a whole, and is formed by a non-magnetic material such as stainless steel, aluminum alloy. The two end parts of the cylindrical cover member 70 in the axial direction protrude toward the inner circumference, and, in the state of being externally inserted to the outer cylindrical member 16, the cylindrical cover member 70 is positioned in the axial direction with respect to the outer cylindrical member 16 by having one end part in the axial direction overlapped with the flange-like part 32 of the outer cylindrical member 16 in the axial direction. In addition, by being sandwiched, via a buffer material such as rubber, between the flange-like part 32 of the outer cylindrical member 16 and the other end part of the cylindrical cover member 70 in the axial direction, the magnetic unit 58 is positioned in the axial direction with respect to the outer cylindrical member 16. In brief, the magnetic unit 58 is sandwiched between the outer cylindrical member 16 and the cylindrical cover member 70 in the radial direction to be positioned in the radial direction, and is sandwiched between the flange-like part 32 of the outer cylindrical member 16 and the other end part of the cylindrical cover member 70 in the axial direction, thereby being firmly set with respect to the outer cylindrical member 16.

The engine mount 10 is installed to a vehicle by installing the inner shaft member 14 to a power unit 72 as a component on a side in vibration damping linkage, and installing the cylindrical cover member 70 fixed to the outer cylindrical member 16 to a vehicle body 74 as a component on the other side in vibration damping linkage, for example. The cylindrical cover member 70, for example, is press-fit with a mounting hole of the vehicle body 74 and fixed to the vehicle body 74. The inner shaft member 14 may also be installed to the power unit 72 via an inner bracket not shown herein. Likewise, the cylindrical cover member 70 may also be installed to the vehicle body 74 via an outer bracket not shown herein.

In the installation state of the engine mount 10 to the vehicle, when a vibration in the upper-lower direction in which the first and second fluid chambers 38*a*, 38*b* are arranged is input to the engine mount 10, a flow of the filled fluid passing through the orifice path 40 is generated between the first and fluid chambers 38*a*, 38*b*, and a vibration damping effect is exerted based on the flowing behavior of the fluid.

In the engine mount 10, it is possible to control the magnetic field applied to the magnetic functional fluid flowing through the orifice path 40 by using the magnetic unit 58. Accordingly, the rheological degree of the magnetic functional fluid can be controlled, and the vibration properties can be regulated or switched. The control of the rheological degree of the magnetic functional fluid by using the magnetic unit 58 is realized by controlling the power conduction to the coil 60.

That is, in the magnetic field formed on the periphery of the coil 60 by conducting power to the coil 60, magnetic poles are at the inner circumferential end of the yoke member 62 arranged on the periphery of the coil 60. In addition, the magnetic flux between the magnetic poles of the yoke member 62 is guided to the magnetic path formation members 44, 44 as a ferromagnetic material. The magnetic path formation members 44, 44 face each other in the axial direction, and the orifice path 40 is formed between the magnetic path formation members 44, 44. Therefore, the magnetic flux of the magnetic field applied to the magnetic path formation members 44, 44 pass through the orifice path 40. In other words, by configuring the sidewall portions of the orifice path 40 to include the magnetic field formation members 44, 44, the magnetic flux of the magnetic field generated by the magnetic unit 58 is guided to the orifice path 40 by the magnetic path formation members 44, 44. Therefore, the magnetic field formed by conducting power to the coil 60 is applied to the magnetic functional fluid generated in the orifice path 40.

In the magnetic functional fluid, the rheological degree increases in accordance with the magnitude (magnetic flux density) of the applied magnetic field. Therefore, the rheological degree of the magnetic functional fluid can be controlled by controlling the intensity of the current flowing through the coil 60. The upper limit of the magnitude of the magnetic field applied to the magnetic functional fluid may be regulated by using the number of turns or the material of the coil 60, the maximum value of the current flowing through the coil 60, etc.

In the embodiment, the magnetic path formation members 44, 44 are arranged on the sidewall portions of the orifice path 40 extending in the circumferential direction on the both sides in the axial direction and are disposed to face each other closely. Therefore, the magnetic flux easily passes through the magnetic functional fluid in the orifice path 40 extending between the magnetic path formation members 44, 44 facing each other. Therefore, magnetic force is efficiently applied to the magnetic functional fluid in the orifice path 40, and the rheological degree of the magnetic functional fluid can be efficiently controlled by the magnetic unit 58 arranged on the outer circumference of the vibration damping device body 12.

The magnetic path formation members 44, 44 forming the two sidewall portions of the orifice path 40 respectively include the magnetic flux concentration parts 46 whose widths gradually decrease in the length direction of the orifice path 40 toward the side of the orifice path 40, which is the inward side in the facing direction. Since in the magnetic flux concentration part 46, the cross-sectional area of the magnetic path gradually decreases toward the side of the orifice path 40, the magnetic flux is concentrated at the inner end in the axial direction, which is the side of the orifice path 40, and the magnetic flux density increases. That is, the magnetic flux passing region in the orifice path 40 is limited to the central portion of the orifice path 40 in the length direction, and the high-density magnetic flux can be locally applied to the magnetic functional fluid in the orifice path 40. With the high-density magnetic flux passing through the magnetic functional fluid in the orifice path 40, the rheological degree of the magnetic functional fluid can be efficiently increased locally in the orifice path 40. As a result, it is possible to significantly increase the flowing resistance of the orifice path 40, and the tuning frequency of the orifice path 40, which is the resonance frequency of the flow of the fluid passing through the orifice path 40, can be regulated with a higher degree of freedom.

In this way, the magnetic flux applied to the entirety in the circumferential direction with respect to the outer ends of the magnetic path formation members 40 in the axial direction is converged toward the inner end in the axial direction in the magnetic flux concentration members 46, and intensively acts on the magnetic functional fluid in the orifice path 40 in a state with an increased magnetic flux density. Therefore, even if the magnetic field generated by the magnetic unit 58 is weaker, the magnetic force with a sufficient magnetic flux density can act on the magnetic functional fluid in the orifice path 40. As a result, excellent vibration damping performance resulting from the control on the rheological degree of the magnetic functional fluid can be obtained, while the current conducted to the coil 60 of the magnetic unit 58 is reduced to suppress the consumed power.

In the embodiment, the tip end surface on the inward side in the axial direction, which is the tip end surface of the magnetic flux concentration part 46 on the side of the orifice path 40, has a dimension in the path length direction of the orifice path 40 set to 60% or less with respect to the total length of the orifice path 40. Accordingly, a strong magnetic force can be locally applied in the length direction with respect to the orifice path 40, and the regulation and switching of the vibration damping properties, which is the objective, can be efficiently realized. In addition, in the path length direction of the orifice path 40, by making the length dimension of the tip end surface of the magnetic flux concentration part 46 to be 10% or more of the total length of the orifice path 40, the magnetic flux acting region with respect to the magnetic functional fluid in the orifice path 40 can be secured in the path length direction, and the vibration damping properties can be regulated or switched efficiently.

The entirety of the magnetic flux concentration part 46 of the embodiment is arranged as the tapered portion 48, and the dimension in the path length direction is continuously reduced toward the tip end surface on the side of the orifice path 40. Accordingly, compared with a stepped magnetic flux concentration part in which the dimension in the path length direction is varied in a stepped manner, a large magnetic path cross-sectional area of the magnetic flux concentration part 46 can be secured in the tapered portion 48, while the dimension of the tip end surface of the magnetic flux concentration part 46 in the path length direction can be reduced to the same extent. By securing a large magnetic path cross-sectional area, the magnetic resistance in the magnetic flux concentration part 46 can be reduced.

The magnetic path formation member 44 may be formed by a soft magnetic material with a small holding force. Accordingly, the magnetization of the magnetic path formation member 44 can accurately follow the control on the power conduction to the coil 60, and the properties of the orifice path 40 can be quickly changed and set in accordance with the input vibration.

The formation region of the orifice path 40 is provided between the intermediate sleeve 24 and the outer cylindrical member 16, and both of the outer cylindrical member 16 and the intermediate sleeve 24 are formed by non-magnetic materials. Accordingly, the outer cylindrical member 16 and the intermediate sleeve 24 do not form a magnetic path, and the magnetic flux can be concentrated at the magnetic path formation member 44. Therefore, the magnetic field can be efficiently applied to the magnetic functional fluid in the orifice path 40, and the rheological degree of the magnetic functional fluid can be controlled.

Although the specific mode of regulating or switching the performance (vibration damping properties) of the engine mount 10 by controlling the rheological degree of the magnetic functional fluid flowing through the orifice path 40 is not particularly limited, and it suffices as long as the control is exerted to satisfy the required performance, a control example is described in the following.

Firstly, when an idling vibration is input, with which an intermediate to high frequency vibration is input, or during a normal traveling state, the coil 60 is not conducted with power, and the rheological degree of the magnetic functional fluid in the orifice path 40 is low. Accordingly, the flowing resistance of the magnetic functional fluid in the orifice path 40 is low, and the magnetic functional fluid with a low rheological degree actively flows through the orifice path 40. As a result, the spring properties of the engine mount 10 are softened, and favorable ride comfort is realized through a vibration damping effect resulting from a low dynamic spring constant.

When a low-frequency, high-amplitude vibration equivalent to an engine shake is input, by conducting power to the coil 60, the rheological degree of the magnetic functional fluid in the orifice path 40 is increased. Accordingly, the flowing resistance of the magnetic functional fluid in the orifice path 40 is increased, and the resonance phenomenon relating to the flow of the magnetic functional fluid in the orifice path 40 is found at a low frequency. Therefore, with the magnetic functional fluid with an increased rheological degree flowing through the orifice path 40, a vibration damping effect with respect to the low frequency vibration is exerted to exert a vibration damping effect resulting from attenuated vibration energy.

In addition, in the case where the power unit 72 undergoes a large roll displacement due to a sudden start of the vehicle, etc., by conducting power to the coil 60 to increase the rheological degree of the magnetic functional fluid in the orifice path 40, the spring properties of the engine mount 10 are hardened. Accordingly, the swing of the power unit 72 is suppressed, and the operation stability and riding comfort of the vehicle can be improved.

In this way, by controlling the power conduction to the coil in accordance with the input vibration, the soft spring properties with excellent vibration insulation performance and the hard spring properties with excellent vibration attenuation performance and support stability of the power unit can be switched as appropriate, and excellent vibration damping performance can be realized. In the embodiment, the switching of ON/OFF of power conduction to the coil 60 is shown. However, instead of controlling ON/OFF of the power conduction to the coil 60, the properties of the engine mount 10 can also be regulated by controlling the intensity of the current flowing to the coil 60. Specifically, in the above property control example, when an engine shake is input and during a roll displacement of the power unit 72, although a current flows to the coil 60 in both cases, the intensities of the current flowing to the coil 60 can differ. That is, for example, it may also be that, during the roll displacement of the power unit 72, a current stronger than that when an engine shake is input flows through, so as to effectively suppress the roll displacement of the power unit 72. In addition, the idling vibration, engine shake, and roll displacement of the power unit 72 described above merely serve as examples. If control with a greater number of stages or continuous control is exerted on the intensity of the current flowing to the coil 60 in accordance with a greater number of types of input vibrations differing from each other in amplitudes or frequencies, the properties of the engine mount 10 can be regulated at a greater number of stages or continuously, and excellent vibration damping performance can be realized. It is noted that the power conduction to the coil 60 may also be controlled to completely stop the flow of the magnetic functional fluid in the orifice path 40 to substantially cut off the orifice path 40.

Figure 8:
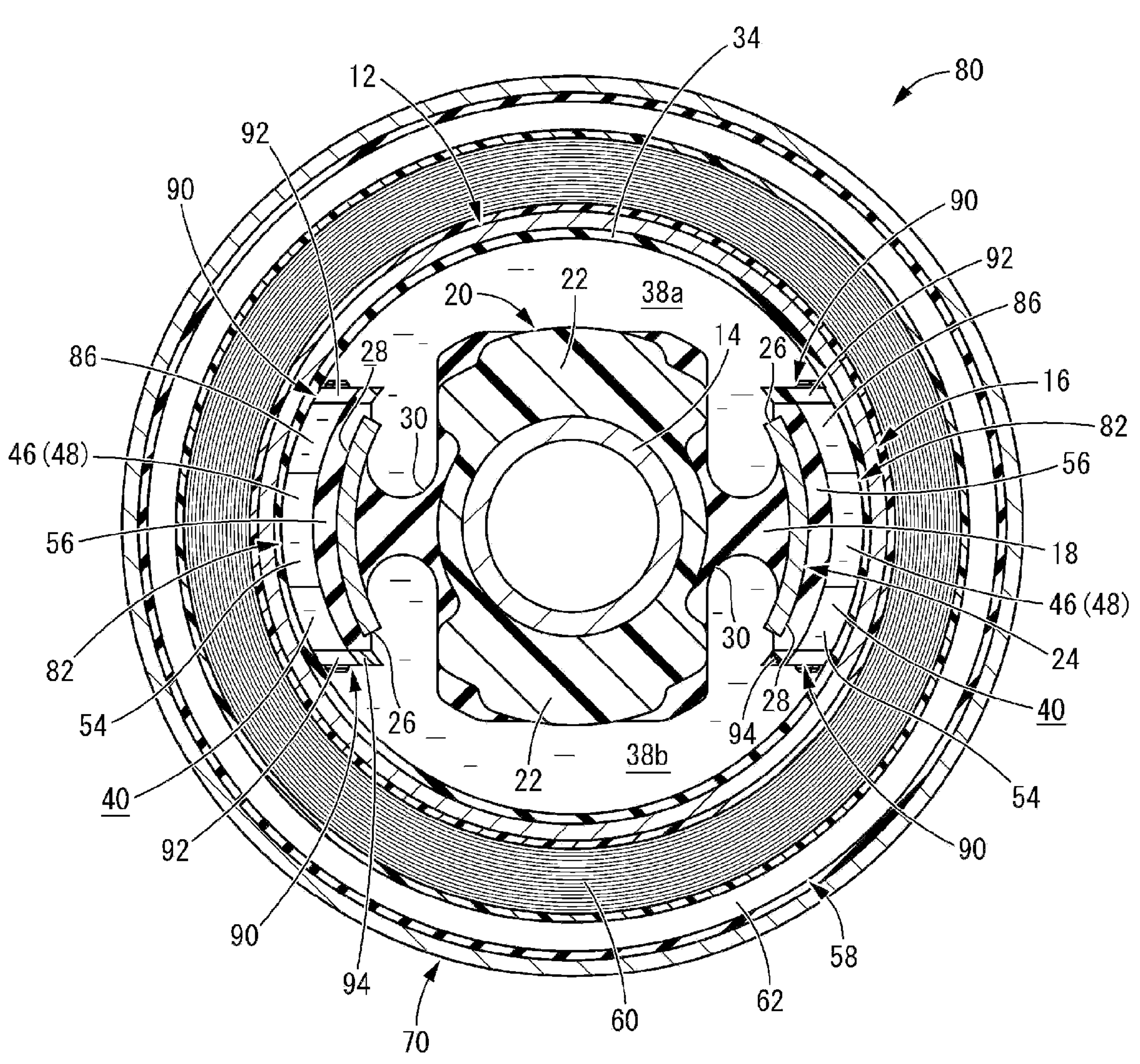
FIG. 8 is a cross-sectional view illustrating an engine mount as a second embodiment of the disclosure.
Figure 9:
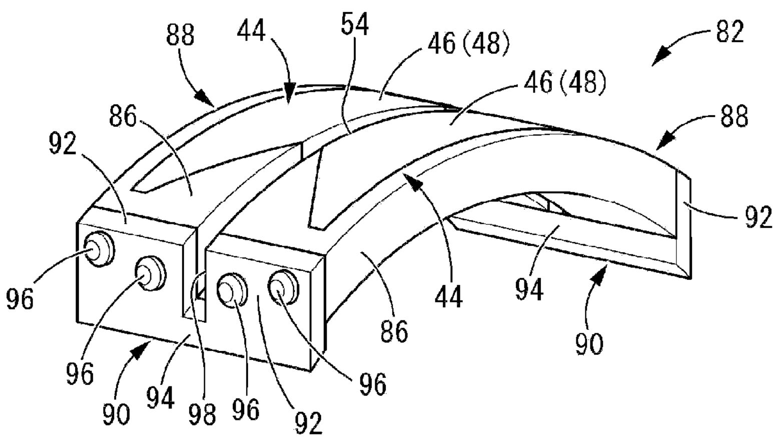
FIG. 9 is a perspective view of an orifice member forming the engine mount shown in FIG. 8.
Figure 10:
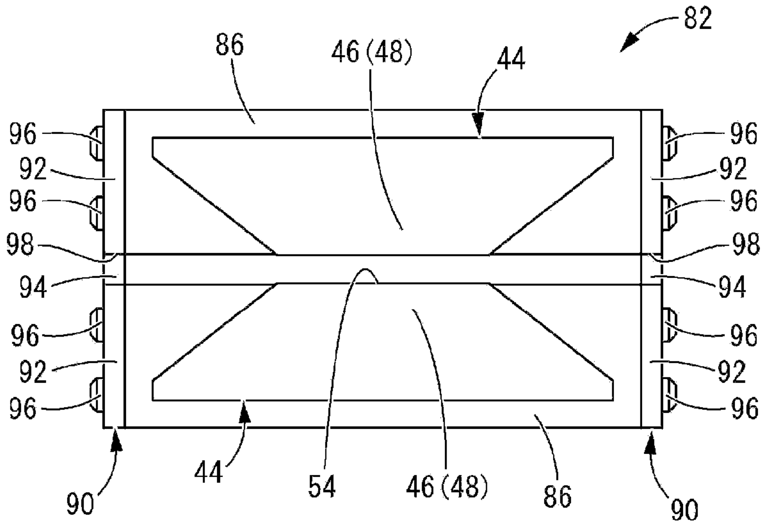
FIG. 10 is a front view of the orifice member shown in FIG. 9.

In FIG. 8, as a second embodiment of a fluid-filled cylindrical vibration damping device configured according to the disclosure, an engine mount 80 of an automobile is shown. The engine mount 80 includes an orifice member 82 shown in FIGS. 9 and 10. In the following, components substantially the same as those of other embodiments are labeled with the same reference symbols, and the descriptions thereof may be omitted.

The orifice member 82 has a configuration in which a pair of flow path members 88, each formed by the magnetic path formation member 44 and a sidewall member 86, are linked with each other at two end parts in the circumferential direction by linking members 90, 90. The flow path member 88 has a configuration in which the sidewall member 86, which is formed by a non-magnetic material, is fixed to the outer surface in the axial direction and two outer surfaces in the circumferential direction of the magnetic path formation member 44 formed by a ferromagnetic material, is arranged in a substantially elongated plate shape or rod shape, and curved in the circumferential direction and extends.

The linking member 90 is arranged in a plate shape and formed by a non-magnetic material. The linking member 90 includes fixing parts 92, 92 overlapped with the respective end surfaces of the flow path members 88, 88 in the circumferential direction and a linking part 94 connecting the fixing parts 92, 92. The fixing part 92 is arranged in a shape corresponding to the end surface of the flow path member 88 in the circumferential direction. Screw holes for insertion of screws 96 are formed to penetrate through the fixing part 92. By fixing the fixing parts 92, 92 to the respective sidewall members 86 of the respective flow path members 88 by using multiple screws 96, respectively, the linking member 90 and the flow path members 88, 88 are fixed to each other. Accordingly, in the embodiment, the pair of magnetic path formation members 44, 44 are linked to each other by being post-fixed by screwing after the linking members 90, 90 respectively including the linking parts 94 are molded. The means for fixing the linking member 90 to the flow path member 88 is not limited to screwing, and may also be fixing by, for example, adhesion, welding, mechanical locking, etc.

The fixing parts 92 are linked with each other by the linking part 94 on the inner circumferential side with respect to the sidewall members 86, 86. By fixing the fixing parts 92, 92 linked to each other by the linking part 94 to the end surfaces of the sidewall members 86, 86 in the circumferential direction, the pair of flow path members 88, 88 are linked to each other by the linking members 90 to form the orifice member 82. The linking part 94 of the embodiment is integrally formed with the fixing parts 92, 92. The linking member 90 may be provided only at one end part of the flow path member 88, 88 in the circumferential direction. However, in the embodiment, the linking members 90 are respectively provided at both end parts of the flow path member 88, 88 in the circumference direction, and the shape stability of the orifice member 82 is facilitated.

By setting the linking part 94 to protrude from the sidewall members 86, 86 toward the inner circumference, a groove-like gap 98 penetrating through in the circumferential direction is formed between the fixing parts 92, 92. In addition, the slit-like part 54 formed between the pair of flow path members 88, 88 are open to both sides in the circumferential direction through the gaps 98, 98 provided at the linking members 90, 90 at two ends in the circumferential direction.

The orifice member 82 with such configuration, like the orifice member 42 of the first embodiment, is installed to the groove-like part 28 of the intermediate sleeve 24. In the orifice member 82, with the end parts of the linking member 90 protruding toward the inner circumference with respect to the flow path members 88, 88 being overlapped with the end surface of the groove-like part 28 in the circumferential direction, the orifice member 82 is positioned in the circumferential direction with respect to the intermediate sleeve 24.

The inner circumferential opening of the slit-like part 54 is blocked by the intermediate sleeve 24, and the outer circumferential opening of the slit-like part 54 is blocked by the outer cylindrical member 16. Accordingly, the orifice path 40 is formed. The slit-like member 54 is in communication with the first and second fluid chambers 38*a*, 38*b* through the gaps 98, 98 of the linking members 90, 90.

By using the engine mount 80 including the orifice member 82 configured in accordance with the embodiment, the same effects as those of the first embodiment can be attained. In addition, compared with the orifice member 42 of the first embodiment in which the pair of magnetic path formation members 44 are integrally linked with the sidewall members 50, 50 by the integrally formed linking parts 52, 52, the orifice member 82 is formed by arranging the flow path members 88, 88 including the sidewall members 86, 86 in which the pair of magnetic path formation members 44, 44 are independent form each other and linking the pair of flow path members 88, 88 to each other by the separate linking members 90, 90. Therefore, it is possible to form the sidewall member 86 and the linking member 90 by using different materials, and a combination of materials in accordance with required performance can be selected. For example, a resin material with excellent moldability is chosen for the sidewall member 86 for which a load resistance is difficult to attain, and a synthetic resin material or a non-magnetic metal material, which exhibits a high strength, is selected for the linking member 90 which may cause an issue of damage due to an input to the linking part 94 with a small cross-sectional area, etc.

Figure 11:
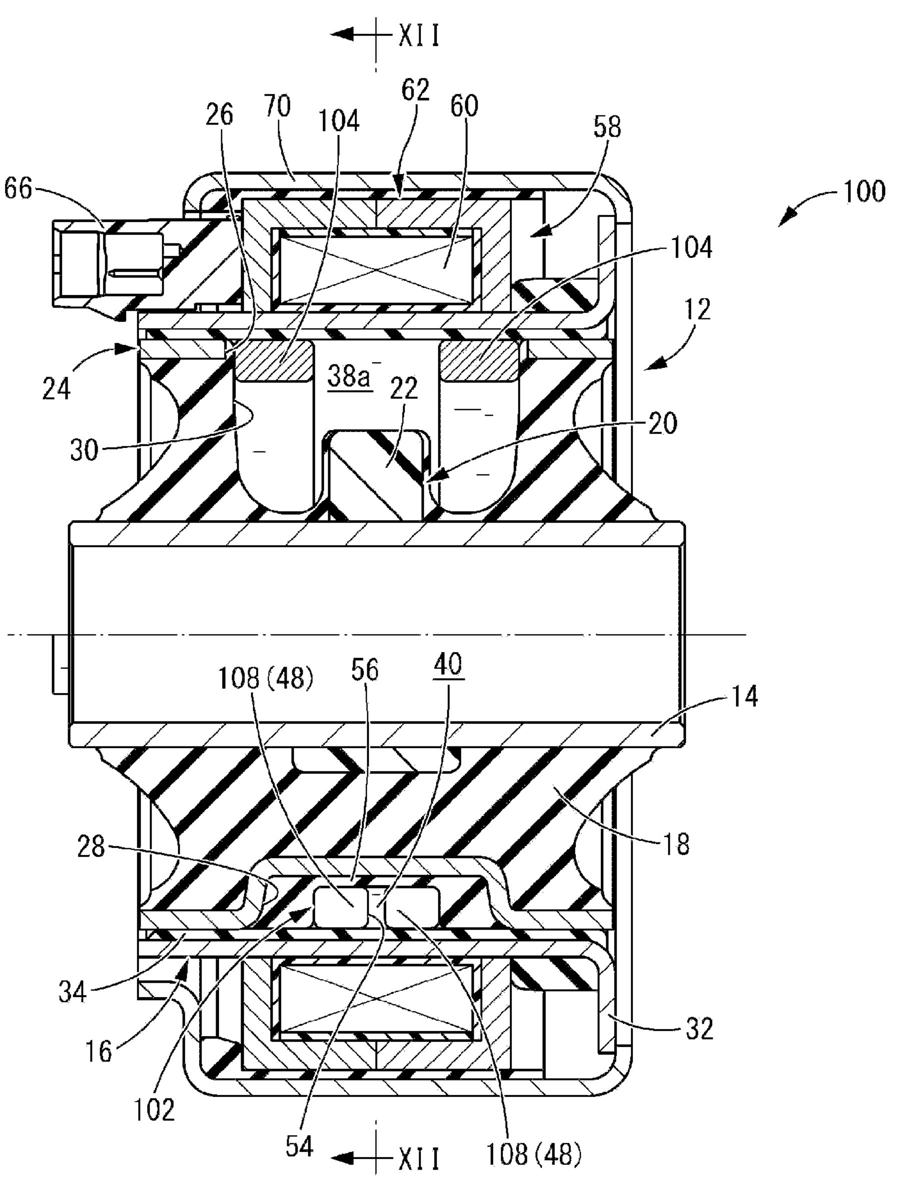
FIG. 11 is a cross-sectional view illustrating an engine mount as a third embodiment of the disclosure, and is equivalent to a cross-section XI-XI of FIG. 12.
Figure 12:
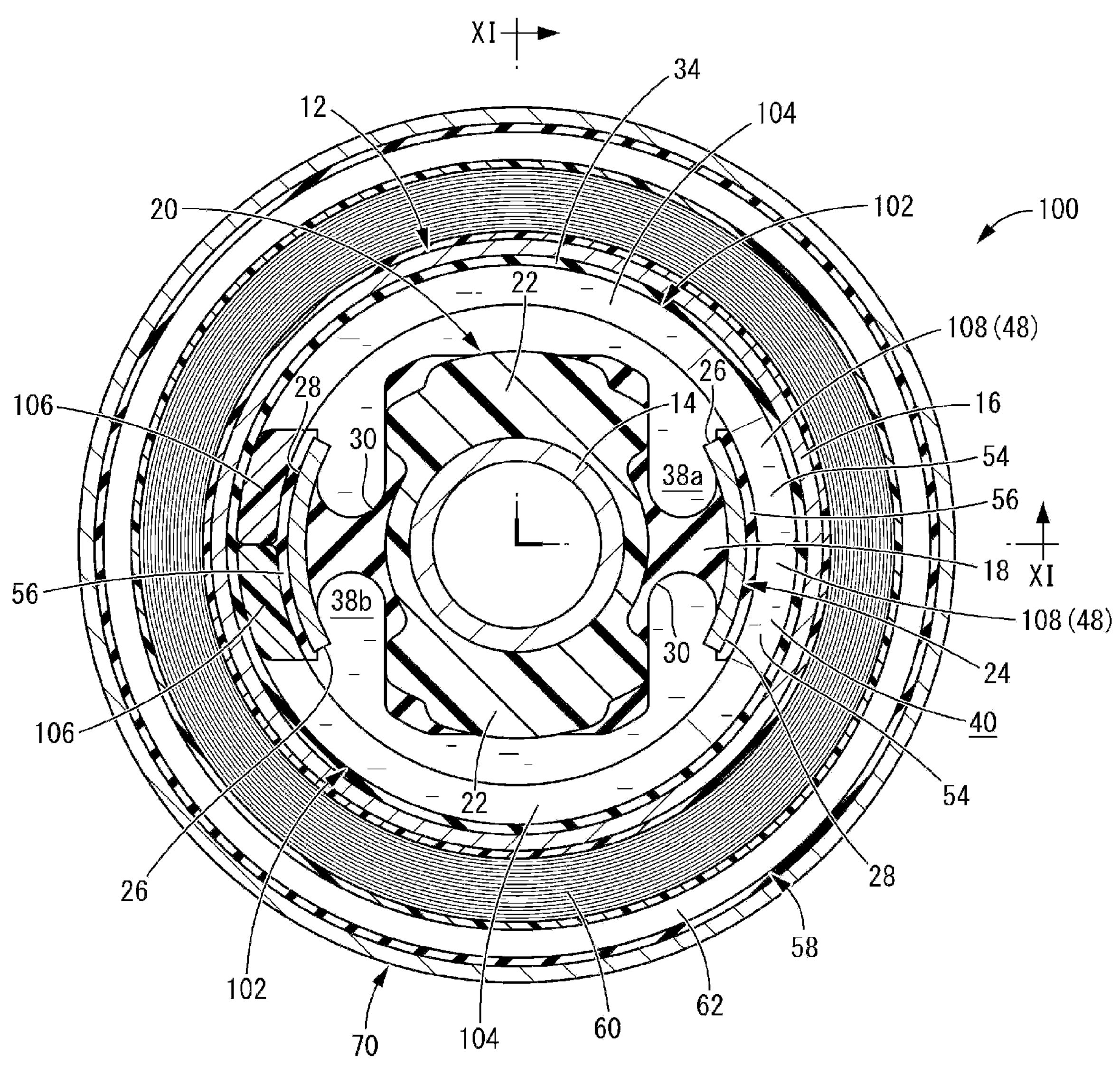
FIG. 12 is a cross-sectional view of XII-XII of FIG. 11.

In FIGS. 11 and 12, as a third embodiment of a fluid-filled cylindrical vibration damping device configured according to the disclosure, an engine mount 100 of an automobile is shown.

The engine mount 100 includes an orifice member 102. As shown in FIGS. 13 to 16, the orifice member 102 includes a pair of magnetic path formation members 104, 104 and a linking part 106 linking the magnetic path formation members 104, 104 to each other.

The magnetic path formation member 104 is formed by a ferromagnetic material, and is arranged in a curved plate shape extending in the circumferential direction. The magnetic path formation member 104 extends in the circumferential direction with a length of substantially a half of the circumference. A magnetic flux concentration part 108 protruding toward the inner side in the axial direction is integrally formed at an end part of the magnetic path formation member 104 in the circumferential direction. In the magnetic flux concentration part 108, the length dimension in the circumferential direction is reduced toward the protrusion tip, and the cross-sectional area in a cross-section (axis right angle cross-section) orthogonal to the protrusion direction is reduced toward the protrusion tip end. The end surface of the magnetic flux concentration part 108 on the other side in the circumferential direction is arranged as a tapered surface inclined to a side in the circumferential direction toward the inward side in the axial direction, and is arranged as a tapered portion 48 in a tapered shape toward the inner side in the axial direction.

In the orifice member 102, the pair of magnetic path formation members 104, 104 arranged in a substantially symmetric shape in the axial direction are separated from each other in the axial direction to be disposed to face each other. Regarding the facing distance between the pair of magnetic path formation members 104, 104, the facing distance at the facing portions of the magnetic flux concentration parts 108, 108 is smaller than the facing distance at other portions.

Figure 13:
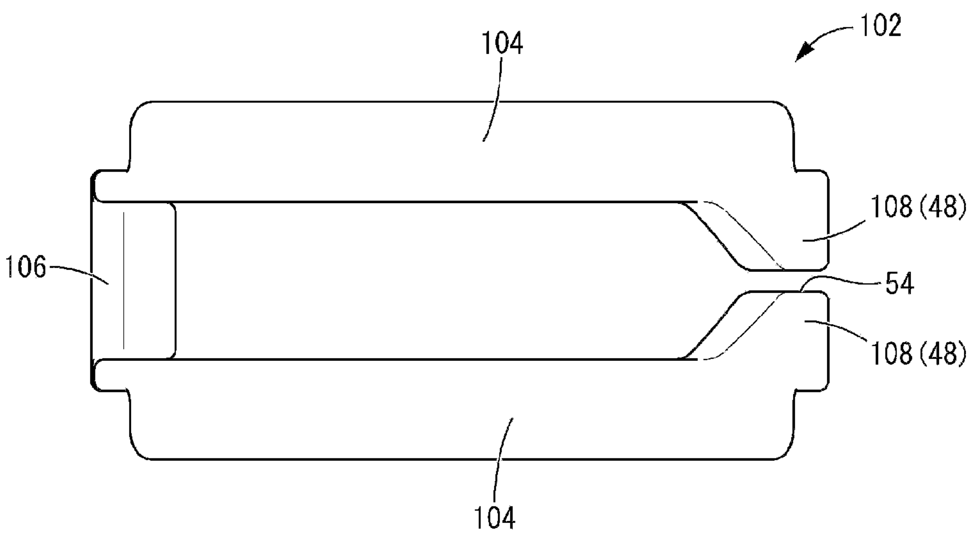
FIG. 13 is a front view of an orifice member forming the engine mount of FIG. 11.
Figure 14:
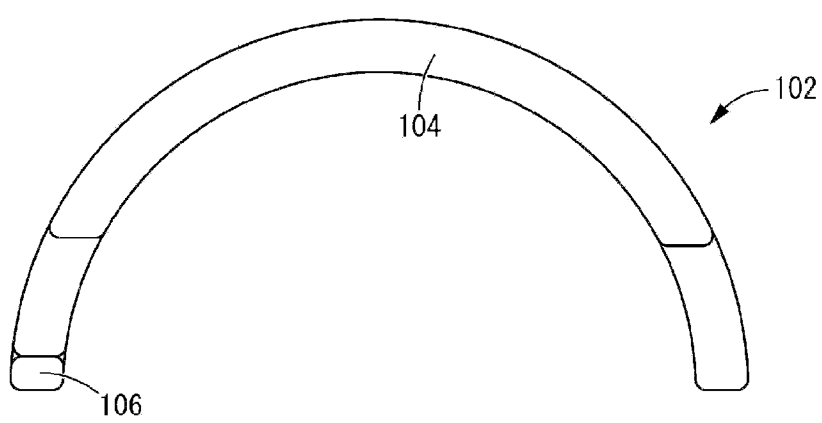
FIG. 14 is a bottom view of the orifice member shown in FIG. 13.
Figure 15:
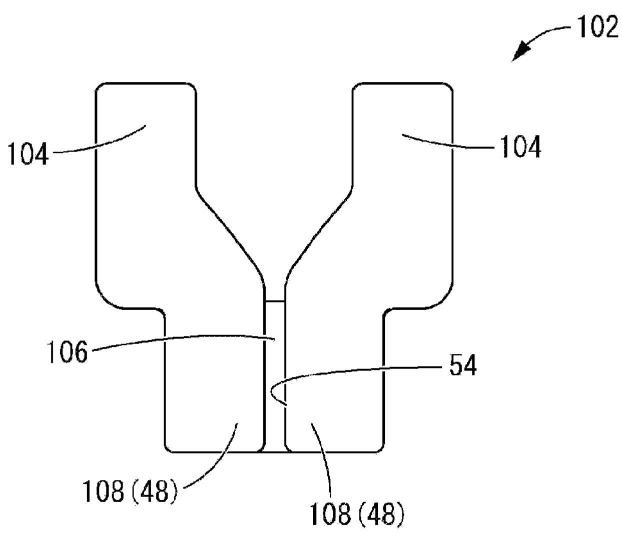
FIG. 15 is a side view of the orifice member shown in FIG. 13.
Figure 16:
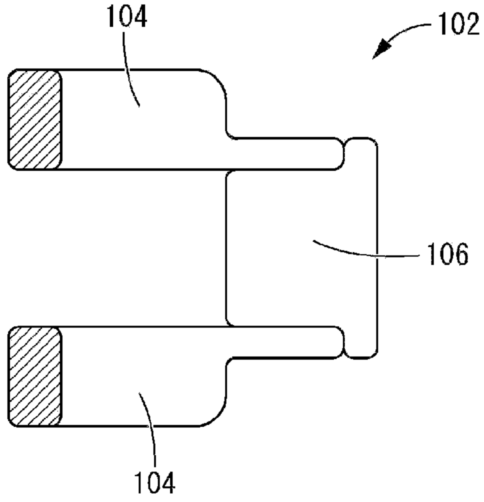
FIG. 16 is a cross-sectional view of XVI-XVI of FIG. 13.

As shown in FIGS. 13 and 16, the pair of magnetic path formation members 104, 104 are linked to each other by the linking part 106 at the other end parts in the circumferential direction. Accordingly, the orifice member 102 is formed. The linking part 106 is formed by a non-magnetic material, such as a synthetic resin, for example, arranged between the pair of magnetic path formation members 104, 104, and fixed to the facing inner surfaces of the pair of magnetic path formation members 104, 104. The linking part 106 of the embodiment extends outward of the pair of magnetic path formation members 104, 104 on the other side in the circumferential direction, and is fixed to the end surfaces of the pair of magnetic path formation members 104, 104 on the other side in the circumferential direction. The linking part 106 may be fixed to the pair of magnetic path formation members 104, 104 through adhesion or welding, etc., after being molded, and may also be fixed integrally at the time of molding.

As shown in FIGS. 11 and 12, a pair of orifice members 102 of such configuration are arranged to face each other. The end parts of the pair of orifice members 102, 102 in the circumferential direction abut against each other, and form an annular shape as a whole. In the pair of orifice members 102, 102, the end parts in the circumferential direction, where the magnetic flux concentration parts 108, 108 are provided, abut against each other in the circumferential direction, and the end parts in the circumferential direction, where the linking parts 106, 106 are provided, abut against each other in the circumferential direction. By making the pair of orifice members 102, 102 abut against each other in the circumferential direction on the side of the magnetic flux concentration parts 108, 108, the magnetic path formation members 104, 104 on the side in the axial direction are continuous in the circumferential direction to form a C-shaped annular shape as a whole, and the magnetic path formation members 104, 104 on the other side in the axial direction are continuous in the circumferential direction to form a C-shaped annular shape as a whole as well. In brief, the magnetic flux concentration part 108 is arranged at the central portion of the magnetic path formation members 104, 104 in the circumferential direction, the magnetic path formation members 104, 104 being arranged in the C-shaped annular shape and extending in the circumferential direction. The pair of magnetic path formation members 104, 104 are separated from each other in the axial direction to be disposed to face each other, and are linked to each other by the linking parts 106, 106 at two end parts in the circumferential direction.

The pair of orifice members 102, 102 arranged in an annular shape are installed to the intermediate sleeve 24 in an externally inserted state. The two end parts of each orifice member 102 in the circumferential direction are positioned with respect to the intermediate sleeve 24 in the axial direction by being inserted to each of the groove-like parts 28, 28 of the intermediate sleeve 24. In addition, by mounting the outer cylindrical member 16 to the intermediate sleeve 24, the outer cylindrical member 16 is installed to the pair of orifice members 102, 102 in an externally inserted state, and the orifice members 102, 102 are held between the intermediate sleeve 24 and the outer cylindrical member 16.

The orifice member 102 is arranged to cross the window part 26 of the intermediate sleeve 24 in the vibration damping device body 12. The two orifice members 102, 102 are arranged to extend in the circumferential direction through the opening portion of the respective window parts 26. Although the orifice members 102, 102 may be separate components with different configurations, the orifice members 102, 102 of the embodiment are common components and installed to the vibration damping device body 12 in different orientations.

In the slit-like parts 54, 54 formed between the magnetic flux concentration parts 108, 108 in the respective orifice members 102, the inner circumferential openings are covered by the bottom wall part of the groove-like part 28 in the intermediate sleeve 24, and the outer circumferential openings are covered by the outer cylindrical member 16, and tunnel-like flow paths extending in the circumferential direction are formed. The tunnel-like flow paths formed by the pair of orifice members 102, 102 are in communication with each other in the circumferential direction, an end part of the tunnel-like flow paths in communication therewith in the circumferential direction is connected with the first fluid chamber 38*a*, and the other end part in the circumferential direction is connected with the second fluid chamber 38*b*. Accordingly, the orifice path 40 allowing the first and second fluid chambers 38*a*, 38*b* to communicate with each other is formed by using the slit-like parts 54, 54. The sidewall portions of the orifice path 40, as a whole, are arranged in a configuration of a combination of four magnetic path formation members 104, 104, 104, 104. On either side in the circumferential direction, which is the path length direction of the orifice path 40, each magnetic path formation member 104 extends in the circumferential direction outward of the end part of the orifice path 40 in the path length direction.

In the engine mount 100 including the orifice members 102, 102, the magnetic flux of the magnetic field generated by the magnetic unit 58 through power conduction to the coil 60 is guided to the magnetic path formation members 104 throughout substantially the entire circumference in the circumferential direction. The magnetic flux guided to the magnetic path formation members 104 intensively passes through the orifice path 40, which is the facing portions of the magnetic flux concentration parts 108, 108 where the facing distance between the magnetic path formation members 104, 104 on one side in the axial direction and the magnetic path formation members 104, 104 on the other side in the axial direction is short. Accordingly, the magnetic flux is intensively applied to the magnetic functional fluid in the orifice path 40, and a magnetic force with a high magnetic flux intensity is locally applied to the magnetic functional fluid. Therefore, the rheological degree of the magnetic functional fluid can be efficiently controlled. As a result, the flow resistance of the orifice path 40, etc., can be efficiently controlled, and it is possible to regulate or switch the tuning frequency of the orifice path 40 and thus the vibration damping properties of the engine mount 100. In this way, according to the configuration of the embodiment, compared with the first and second embodiments, the magnetic flux of a wider range in the circumferential direction can be guided to the orifice path 40 and a stronger magnetic force can be applied to the magnetic functional fluid. Therefore, the vibration damping properties can be effectively regulated or switched by consuming less power.

Figure 17:
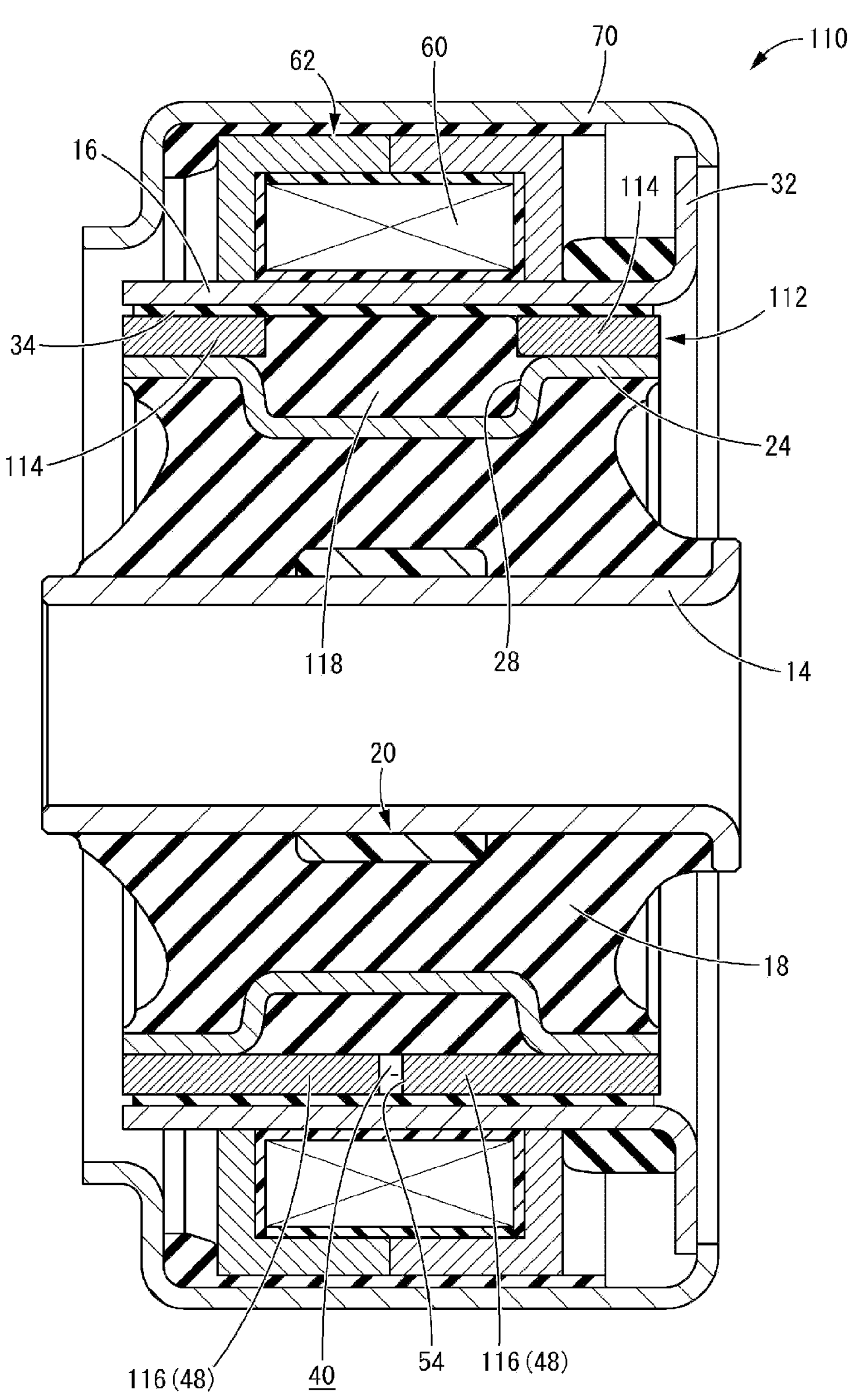
FIG. 17 is a cross-sectional view illustrating an engine mount as a fourth embodiment of the disclosure.

In FIG. 17, as a fourth embodiment of a fluid-filled cylindrical vibration damping device configured according to the disclosure, an engine mount 110 of an automobile is shown.

Figure 18:
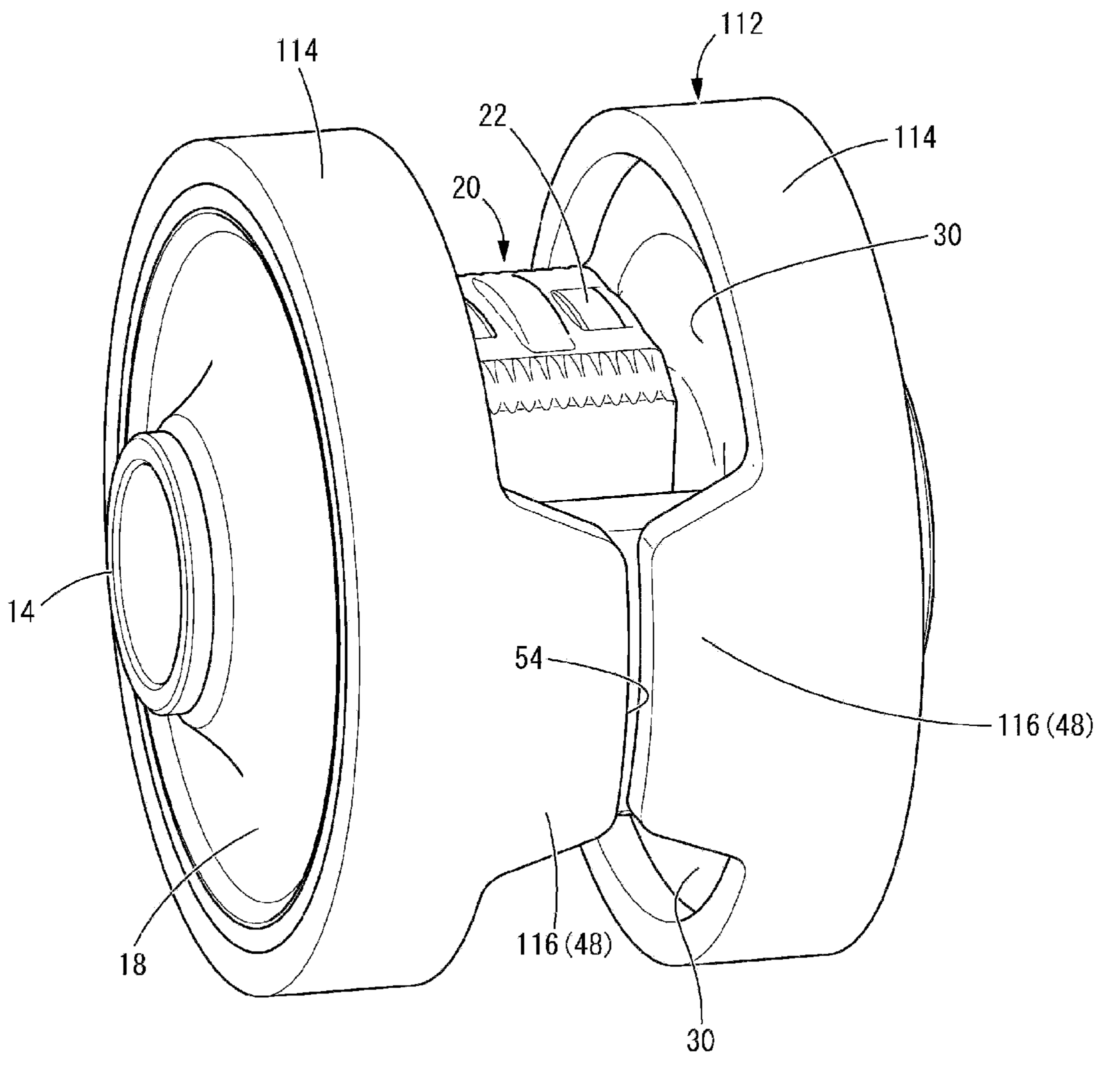
FIG. 18 is a perspective view illustrating the engine mount shown in FIG. 17 in a state in which an outer cylindrical member is not mounted.

The engine mount 110 includes an orifice member 112. The orifice member 112 is formed by a pair of magnetic path formation members 114, 114 as also shown in FIG. 18. The magnetic path formation member 114 is formed by a ferromagnetic material, and is arranged in an annular shape continuous throughout the entire circumference. The magnetic path formation member 114 includes a magnetic flux concentration part 116 protruding toward the inner side in the axial direction at a portion in the circumferential direction. The length of the magnetic concentration part 116 in the circumferential direction is gradually reduced toward the protrusion tip end. The magnetic flux concentration part 116 of the embodiment has an end surface in the circumferential direction arranged as a tapered surface, and has a tapered shape in which the cross-sectional area is reduced toward the protrusion tip end.

The magnetic path formation member 114 is installed to an end part of the intermediate sleeve 24 in the axial direction in an externally inserted state. The magnetic path formation member 114 is fixed to the intermediate sleeve 24 by, for example, pressing or diameter reduction in the externally inserted state. The magnetic path formation member 114 is respectively installed to the two end parts of the intermediate sleeve 24 in the axial direction, respectively. The pair of magnetic path formation members 114, 114 are separated from each other to be disposed to face each other in the axial direction, and the magnetic flux concentration parts 116, 116 are positioned with respect to each other in the circumferential direction and separated by a predetermined distance in the axial direction to face each other. In the orifice member 112, the pair of magnetic path formation members 114, 114 are independent from each other, and are separately installed to the intermediate sleeve 24. The groove-like part 28 of the intermediate sleeve 24 of the embodiment is filled by a blocking rubber 118 integrally formed with the main rubber elastic body 18. In addition, a protrusion portion of the blocking rubber 118 protruding from the groove-like part 28 toward the outer circumference is inserted between the portions of the pair of magnetic path formation members 114, 114 where the magnetic flux concentration parts 116, 116 are not provided. With the pair of magnetic path formation members 114, 114 abutting against the protrusion portion of the blocking rubber 118, the pair of magnetic path formation members 114, 114 are positioned with respect to the intermediate sleeve 24 in the axial direction.

As shown in FIG. 17, the outer cylindrical member 16 is installed, in an externally inserted state, to the magnetic path formation members 114, 114 installed to the intermediate sleeve 24. Accordingly, the magnetic path formation members 114, 114 are held between the intermediate sleeve 24 and the outer cylindrical member 16 in the radial direction. In the slit-like part 54 formed between the magnetic flux concentration parts 116, 116 of the magnetic path formation members 114, 1141 in the axial direction, the inner circumferential opening is covered by the intermediate sleeve 24 via the blocking rubber 118, the outer circumferential opening is covered by the outer cylindrical member 16 via the seal rubber layer 34, and the orifice path 40 extending in the circumferential direction is formed by using the slit-like part 54.

In the engine mount 110 of the embodiment having such configuration as well, the magnetic flux of the magnetic field generated by the magnetic unit 58 is applied to the magnetic functional fluid of the orifice path 40 in an intensive, high-density state by using the magnetic flux concentration parts 116 of the magnetic path formation members 114. Therefore, excellent vibration damping performance can be obtained through regulating or switching the properties of the orifice path 40, and the consumed power can be reduced by suppressing the power required for forming the magnetic field.

In the embodiment, the magnetic path formation member 114 extends to the outer side in the circumferential direction with respect to the orifice path 40, and is arranged in an annular shape continuous throughout the entire circumference. Accordingly, the magnetic flux of the entire circumference in the circumferential direction is guided into the orifice path 40 through the magnetic path formation member 114, and a strong magnetic force can be efficiently applied to the magnetic functional fluid in the orifice path 40. Moreover, in the embodiment, as shown in FIG. 17, the magnetic path formation member 114 is arranged at a position overlapped, in radial projection, with a magnetic pole formation portion in the yoke member 62 of the magnetic unit 58, and the distance between the magnetic path formation member 114 and the magnetic pole formation portion in the yoke member 62 is reduced. Therefore, magnetic flux leakage between the magnetic path formation member 114 and the yoke member 62 can be suppressed.

Although the embodiments of the disclosure have been described above in detail, the disclosure is not limited to such detailed description. For example, in the above embodiment, a configuration in which the magnetic flux concentration parts 46 are respectively provided in both of the magnetic path formation members 44, 44 on the both sides in the axial direction. However, a configuration in which the magnetic flux concentration part 46 is provided in one of the magnetic path formation members 44 and not provided in the other magnetic path formation member 44 may also be adopted.

It may also be that the magnetic flux concentration part 46 is not provided with the tapered portion 48 of a tapered shape whose cross-sectional area varies continuously toward the side of the orifice path 40 (from the outward side toward the inward side in the mount axial direction in the embodiment). For example, the magnetic flux concentration part 46 may also have a stepped shape in which the dimension in the length direction (circumferential direction) of the orifice path 40 toward the orifice path 40 varies in a stepped manner. In addition, in the magnetic flux concentration part 46, the tapered portion 48 may also be partially provided in the path length direction and/or the path width direction of the orifice path. For example, in the magnetic flux concentration part 46, the tip end part on the side of the orifice path 40 may be arranged as the tapered portion 48, and the base end part away from the orifice path 40 may be arranged in a stepped shape. In addition, it may also be that, in addition to the dimension in the length direction of the orifice path 40, the dimension of the magnetic flux concentration part 46 in the height dimension (radial direction) is reduced toward the orifice path 40. In the tapered portion, both ends in the path length direction of the orifice path 40 may also be arranged in a stepped shape or a tapered shape, or only one of the ends may be arranged in the stepped shape or the tapered shape (i.e., single inclination).

It is not required that the end part of the magnetic flux concentration part 46 on the side of the orifice path 40 has a surface extending in the length direction of the orifice path 40. For example, the tip end may also be arranged as pointed with the dimension in the length direction of the orifice path 40 being substantially zero.

In the magnetic flux concentration part 46, multiple tip end parts on the side of the orifice path 40, which form the sidewall portions of the orifice path 40, may be provided in the length direction of the orifice path 40. In the case where multiple magnetic flux concentration parts 46 form the sidewall portions of the orifice path 40, the total of the dimensions of the tip end parts of the magnetic flux concentration parts 46 in the length direction of the orifice path 40 may be 60% or less, or 40% or less, with respect to the length dimension of the orifice path 40.

Although the magnetic path formation members 44, 44 arranged on the sidewall portions on the both sides of the orifice path 40 may be independent from each other or linked to each other by a linking part of a non-magnetic material, the magnetic path formation members 44, 44 may also be configured as an integral configuration integrally linked at the end parts in the circumferential direction, for example. In brief, the magnetic path formation members 44, 44 may also be linked by a ferromagnetic material as long as the magnetic force acting on the orifice path 40 is secured.

In the above embodiment, an example in which the pair of magnetic flux concentration parts 46, 46 forming the sidewall portions of the orifice path 40 are positioned to each other in the circumferential direction and are disposed to face each other in the facing direction (axial direction) of the sidewall portions of the orifice path 40. However, it may also be that the magnetic flux concentration parts 46, 46 are arranged at positions different from each other in the circumferential direction, and do not face each other in the facing direction of the sidewall portions of the orifice path 40, for example. That is, when providing the magnetic flux concentration parts 46, 46 on two sidewall portions of the orifice path 40, magnetic flux concentration parts 46, 46 with shapes or sizes different from each other may be adopted. In addition to disposing at least portions of the respective tip end parts (end parts on the side of the orifice path 40) in the magnetic flux concentration parts 46, 46 on the both sides to face each other in the orifice width direction (mount axial direction), the respective tip end parts may also be disposed at positions different from each other in the orifice length direction, thereby being disposed to face each other in an inclined direction.

In the embodiment, the orifice path 40 with a configuration extending in the circumferential direction is shown. However, for example, the orifice path may also extend in the circumferential direction while being inclined in the axial direction, extend in the circumferential direction while meandering, or inclined in the axial direction, and is not limited to a configuration extending in the circumferential direction without inclination in the axial direction.

In the embodiment, a configuration in which the magnetic unit 58 is installed to the outer circumferential surface of the outer cylindrical member 16 is shown. However, it suffices as long as the magnetic unit can selectably or controllably apply a magnetic field to the magnetic flux concentration parts 46 forming the sidewall portions of the orifice path 40. For example, the magnetic unit may also be disposed on the inner circumferential side of or inside the inner shaft part, the outer cylindrical member, the main rubber elastic body, etc. For example, as disclosed in Japanese Laid-open No. 2020-133700, the magnetic unit is disposed inside the inner shaft member. In addition, an accommodation space of the magnetic unit may be provided inside the outer cylindrical member or inside the main rubber elastic body, and may also be arranged on the inner circumference of the inner shaft member arranged to be hollow. In addition, it is not required that the coil of the magnetic unit is wound in the circumferential direction throughout the entire circumference of the outer cylindrical member. For example, the coil may also be arranged to be partially located in the circumferential direction.

What is claimed is:

1. A fluid-filled cylindrical vibration damping device, wherein an inner shaft member and an outer shaft member are elastically linked by a main rubber elastic body, and a plurality of fluid chambers in which a fluid is filled are provided to be in communication with each other through an orifice path, wherein the fluid filled in the fluid chambers is a magnetic functional fluid, the fluid-filled cylindrical vibration damping device comprises a magnetic unit generating a magnetic field through power conduction, magnetic path formation members to which the magnetic field is applied by the magnetic unit are arranged on opposing sidewall portions of the orifice path, and a magnetic flux concentration part is provided at at least one of the magnetic path formation members arranged on the opposing sidewall portions, and a dimension of the magnetic flux concentration part in a length direction of the orifice path is reduced toward an opposing one of the opposing sidewall portions.

2. The fluid-filled cylindrical vibration damping device as claimed in claim 1, wherein the magnetic path formation members arranged on the opposing sidewall portions of the orifice path are components independent from each other, and are linked to each other by a linking part.

3. The fluid-filled cylindrical vibration damping device as claimed in claim 2, wherein the magnetic path formation members arranged on the opposing sidewall portions of the orifice path are formed by a ferromagnetic material, and the linking part is formed by a non-magnetic material.

4. The fluid-filled cylindrical vibration damping device as claimed in claim 3, wherein the magnetic path formation members arranged on the opposing sidewall portions of the orifice path are integrally formed with the linking part.

5. The fluid-filled cylindrical vibration damping device as claimed in claim 3, wherein the magnetic path formation members arranged on the opposing sidewall portions of the orifice path are linked by post-fixing the linking part formed by a separate component to the magnetic path formation members arranged on the opposing sidewall portions of the orifice path.

6. The fluid-filled cylindrical vibration damping device as claimed in claim 2, wherein the magnetic path formation members arranged on the opposing sidewall portions of the orifice path are integrally formed with the linking part.

7. The fluid-filled cylindrical vibration damping device as claimed in claim 2, wherein the magnetic path formation members arranged on the opposing sidewall portions of the orifice path are linked by post-fixing the linking part formed by a separate component to the magnetic path formation members arranged on the opposing sidewall portions of the orifice path.

8. The fluid-filled cylindrical vibration damping device as claimed in claim 1, wherein the magnetic path formation member extends outward of the orifice path on at least one side in the length direction of the orifice path.

9. The fluid-filled cylindrical vibration damping device as claimed in claim 8, wherein the magnetic path formation member extends outward in a circumferential direction from two end parts in the length direction of the orifice path, respectively, and is arranged, as a whole, in an annular shape extending in a circumferential direction of the outer cylindrical member.

10. The fluid-filled cylindrical vibration damping device as claimed in claim 9, wherein an intermediate sleeve is fixed to an outer circumferential portion of the main rubber elastic body, and the magnetic path formation member arranged, as a whole, in the annular shape is installed to the intermediate sleeve in an externally inserted state, and the outer cylindrical member is installed to the magnetic path formation member in an externally inserted state.

11. The fluid-filled cylindrical vibration damping device as claimed in claim 1, wherein the opposing sidewall portions of the orifice path are formed by combining the magnetic path formation members and a sidewall member formed by a non-magnetic material, and the magnetic path formation members partially form the opposing sidewall portions of the orifice path in the length direction.

12. The fluid-filled cylindrical vibration damping device as claimed in claim 1, wherein the magnetic path formation members arranged on the opposing sidewall portions of the orifice path are arranged in shapes symmetric to each other.

13. The fluid-filled cylindrical vibration damping device as claimed in claim 1, wherein the magnetic flux concentration part in the magnetic path formation member has a tapered portion whose dimension in the length direction of the orifice path is gradually reduced toward the opposing one of the opposing sidewall portions.

14. The fluid-filled cylindrical vibration damping device as claimed in claim 1, wherein in a tip end surface in the magnetic flux concentration part of the magnetic path formation member on the opposing one of the opposing sidewall portions, a dimension in the length direction of the orifice path is 60% or less with respect to a total length of the orifice path.

* * * * *